(12) United States Patent
Wakai

(10) Patent No.: US 8,095,576 B2
(45) Date of Patent: Jan. 10, 2012

(54) RECORDING DEVICE

(75) Inventor: Ryohei Wakai, Osaka (JP)

(73) Assignee: Panasonic Corporation, Osaka (JP)

( * ) Notice: Subject to any disclaimer, the term of this patent is extended or adjusted under 35 U.S.C. 154(b) by 211 days.

(21) Appl. No.: 12/513,259

(22) PCT Filed: Nov. 1, 2007

(86) PCT No.: PCT/JP2007/071294
§ 371 (c)(1),
(2), (4) Date: Jun. 2, 2009

(87) PCT Pub. No.: WO2008/056593
PCT Pub. Date: May 15, 2008

(65) Prior Publication Data
US 2010/0023567 A1  Jan. 28, 2010

(30) Foreign Application Priority Data

Nov. 6, 2006  (JP) .................................. 2006-300745

(51) Int. Cl.
*G06F 17/30* (2006.01)
*G06F 7/00* (2006.01)

(52) U.S. Cl. ......... 707/812; 707/610; 707/781; 707/823

(58) Field of Classification Search .................. None
See application file for complete search history.

(56) References Cited

U.S. PATENT DOCUMENTS

| | | | | |
|---|---|---|---|---|
| 4,815,062 A | * | 3/1989 | Suzuki | 369/47.23 |
| 4,827,462 A | * | 5/1989 | Flannagan et al. | 369/30.09 |
| 5,007,027 A | | 4/1991 | Shimoi | |
| 5,218,685 A | * | 6/1993 | Jones | 711/160 |
| 5,784,646 A | * | 7/1998 | Sawada | 710/38 |
| 6,138,203 A | * | 10/2000 | Inokuchi et al. | 711/103 |
| 6,144,969 A | * | 11/2000 | Inokuchi et al. | 707/705 |
| 6,667,939 B1 | * | 12/2003 | Miyamoto | 369/53.21 |

(Continued)

FOREIGN PATENT DOCUMENTS

JP  64-76346  3/1989

(Continued)

OTHER PUBLICATIONS

International Search Report issued Jan. 29, 2008 in the International (PCT) Application of which the present application is the U.S. National Stage.

*Primary Examiner* — Greta Robinson
*Assistant Examiner* — James J Wilcox
(74) *Attorney, Agent, or Firm* — Wenderoth, Lind & Ponack, L.L.P.

(57) ABSTRACT

In the case of recording pieces of cache data stored in a cache information management unit onto a recording medium, a recording device pertaining to the present invention records, according to designation of a recording area by a file management unit, pieces of data that are to be recorded into empty areas on the recording medium before recording pieces of data that are to be recorded into occupied areas on the recording medium. This prevents that the pieces of data to be recorded into the occupied areas on the recording medium from being recorded into the empty areas. As a result, the recording device pertaining to the present invention can reduce the number of overwrite operations as a whole.

5 Claims, 14 Drawing Sheets

U.S. PATENT DOCUMENTS

| | | | |
|---|---|---|---|
| 7,612,806 B2 * | 11/2009 | Kazami et al. | 348/231.1 |
| 2002/0032671 A1 | 3/2002 | Iinuma | |
| 2005/0223167 A1 | 10/2005 | Nishimoto et al. | |
| 2006/0117242 A1 * | 6/2006 | Hamelinck et al. | 714/763 |
| 2006/0288263 A1 | 12/2006 | Nakamura | |
| 2007/0286046 A1 * | 12/2007 | Nagar et al. | 369/53.24 |
| 2008/0192595 A1 * | 8/2008 | Ghotge et al. | 369/47.14 |
| 2008/0232210 A1 * | 9/2008 | Buban et al. | 369/47.13 |
| 2008/0310289 A1 * | 12/2008 | Gotoh et al. | 369/275.3 |

FOREIGN PATENT DOCUMENTS

| | | |
|---|---|---|
| JP | 1-288948 | 11/1989 |
| JP | 5-257810 | 10/1993 |
| JP | 2002-91811 | 3/2002 |
| JP | 2002-99390 | 4/2002 |
| JP | 2005-284816 | 10/2005 |
| JP | 2005-302111 | 10/2005 |
| WO | 2005/124769 | 12/2005 |

* cited by examiner

FIG. 7

| STATE NUMBER | DIRTY CACHE | RECORDING MEDIUM |
|---|---|---|
| (1) | A  B  C  D<br>2  4  6  7 | 1 2 3 4 5 6 7 8 9 10 |
| (2) | A  B     D<br>2  4     7 | 1 2 3 4 5 6(C) 7 8 9 10 |
| (3) | A  B<br>2  4 | 1 2 3 4 5 6(C) 7(D) 8 9 10 |
| (4) | B<br>4 | 1 2 3 4 5 6(C) 7(D) 8(A) 9 10<br>2→8 |
| (5) |  | 1 2 3 4 5 6(C) 7(D) 8(A) 9(B) 10<br>2→8  4→9 |

RECORDING DEVICE

TECHNICAL FIELD

The present invention relates to a recording device that performs recording on a recording medium according to a POW (Pseudo Over Write) method, and particularly to a recording device that has a buffer cache management function for reducing the number of overwrite operations.

BACKGROUND ART

Various methods for virtually realizing overwriting of data is adopted in write-once media that only allow sequential recording, such as DVD-R (Digital Versatile Disk), DVD+R and BD-R (Blu-ray Disc). This is because it is impossible to directly rewrite the data recorded on such media.

For example, according to the POW recording method, which is defined in the UDF (Universal Disk Format) Revision 2.60 standard and is applied to BD-R, a recording device realizes the virtual overwriting of data in the following manner. A recording device sequentially writes new data for the overwriting in the data area of a recording medium. That is, the recording device writes the new data at the tail of the existing data separately from the old data to be overwritten. The recording device stores substitution information, which shows the correspondence between the address of the area where the old data is recorded and the address of the area where the new data is recorded, into a POW information management area that is defined separately from the data recording area on the recording medium.

Meanwhile, since writing to and reading from recording media such as BD-R media is considerably slower than such processing performed on a memory, part of the memory area is often used as a disk cache.

As control methods used for recording of data stored in the disk cache onto the recording medium, there are a write through method and a write back method.

According to the write through method, when storing the data in the disk cache, the recording device also writes the data onto the recording medium. On the other hand, according to the write back method, the recording device firstly writes the data only in the disk cache, and writes the data onto the recording medium when, for example, the disk cache becomes full.

Since the required number of writing operations is smaller for the write back method than the write through method, the write back method is more suitable for the write-once media mentioned above.

For example, Patent Document 1 and Patent Document 2 each disclose technologies that use such a cache technique.
Patent Document 1: Japanese Laid-open Patent Application Publication No. 2002-91811
Patent Document 2: Japanese Laid-Open Patent Application Publication No. 5-257810

SUMMARY OF THE INVENTION

As described above, according to the POW recording method, a recording device writes the new data into the data area on the recording medium and the substitution information into the POW information management area on the recording medium. This means that the data amount is increased and the remaining capacity of the recording medium is decreased accordingly. Thus, it is preferable to decrease the number of overwrite operations as much as possible.

However, even in the case of the recording according to the write back method, the number of overwrite operations might increase. The following explains such increase, with reference to FIG. 14.

FIG. 14 shows example operations in which pieces of cache data, each having a difference from its corresponding data on the recording medium, are recorded on the recording medium in the ascending order of the addresses of the target recording medium (Such cache data is hereinafter called "dirty cache data").

In the drawing, a state number 1401 is a number for explaining the state. A dirty cache 1402 shows a state of each piece of dirty cache data remaining on the disk cache. A recording medium 1403 shows a state of each piece of data recorded on the recording medium.

The numbers shown in the dirty cache 1402 are addresses on the recording medium, which are used for recording the pieces of dirty cache data onto the recording medium. These addresses are assigned by the file system.

If the state number 1401 is (1), the state is the initial state where the disk cache stores: dirty cache data "A" which is to be recorded at the address 2 on the recording medium; dirty cache data "B" which is to be recorded at the address 4; dirty cache data "C" which is to be recorded at the address 6; and dirty cache data "D" which is to be recorded at the address 7.

It is assumed that the recording medium 109 includes recording areas identified by addresses 1 to 10 respectively, and in the case where the state number 1401 is (1), the areas corresponding to the addresses 1 to 5 already contain data, and the areas corresponding to the addresses 6 to 10 are empty.

In the following explanation, the starting address of the empty areas is called "NWA (Next Writable Address)". For example, in the case the state number 1401 is (1), the NWA is the address "6".

In the state where the state number 1401 is (2), the dirty cache data "A", which should be written in the area with the smallest address among the pieces of the cache data, has been recorded in the area with the address 2. Since the writing to the address 2 is overwriting, the data "A" has been actually written to the address 6, which is the NWA, and the substitution information showing "address 2→address 6" has been recorded in the POW information management area. The arrows shown in the recording medium 1403 each indicate the substitution information.

Since the dirty cache data "A" has been recorded on the recording medium, the dirty cache data "A" does not appear in the dirty cache 1402, and the NWA has moved to the address 7.

In the state where the state number 1401 is (3), the dirty cache data "B" has been recorded in the address 4. Since the writing to the address 4 is overwriting, the data "B" has been actually written to the address 7, which is the NWA, and the substitution information showing "address 4→address 7" has been recorded in the POW information management area. The NWA has moved to the address 8.

In the state where the state number 1401 is (4), the dirty cache data "C" has been recorded in the address 6. Since the writing to the address 6 is overwriting, the data "C" has been actually written to the address 8, which is the NWA, and the substitution information showing "address 6→address 8" has been recorded in the POW information management area.

In the state where the state number 1401 is (1), the NWA is the address 6. Thus, if the dirty cache data "C" was recorded when the state number 1401 was (1), the writing would not be overwriting.

However, the dirty cache "A" and "B" were recorded in the state where the state number 1401 was (2) and (3) respectively, the NWA was changed, and the recording of the dirty cache data "C" would be overwriting.

In the state where the state number 1401 is (5), the dirty cache data "D" has been recorded in the address 7. Since the writing to the address 7 is overwriting, the data "D" has been actually written to the address 9, which is the NWA, and the substitution information showing "address 7→address 9" has been recorded in the POW information management area.

In the same manner as the dirty cache data "C", since the NWA is the address 6 in the state where the state number 1401 is (1), if the dirty cache data "D" was recorded when the state number 1401 was (1), the writing would not be overwriting.

However, the dirty cache "B" and "C" were recorded in the state where the state number 1401 was (3) and (4) respectively, the NWA was changed, and the recording of the dirty cache data "D" would be overwriting.

In this way, according to the conventional art, actual writing of data onto the recording medium can be overwriting even if writing of the data into the disk cache was not overwriting. This means that extra substitution information requires to be written in the POW information management area.

In view of this problem, the present invention aims to provide a recording device with which the number of overwrite operations onto a recording medium can be decreased.

Means to Solve the Problem

To solve the problem, one aspect of the present invention is a recording device that records pieces of data stored in a memory area into recording areas on a recording medium, the recording device comprising: a judgment unit operable to judge, when each of the pieces of data is required to be recorded into a designated one of the recording areas, whether the designated recording area satisfies a predetermined condition; and a recording control unit operable to record pieces of data that correspond to recording areas that have been judged affirmatively by the judgment unit, before recording any pieces of data that correspond to recording areas that have been judged negatively by the judgment unit.

Advantageous Effects of the Present Invention

The following explains advantageous effects of the recording device pertaining to the present invention with the stated structure. In this explanation, it is assumed that a "particular condition" is a condition that no data has been recorded in the designated area when the recording device starts writing pieces of data recorded on the memory area to a recording medium that is a write-once medium that allows the sequential writing.

The recording device pertaining to the present invention with the stated structure records pieces of data that correspond to recording areas that have been judged as satisfying the predetermined condition, before recording any pieces of data that correspond to recording areas that have been judged as not satisfying the predetermined condition. Thus, as a whole, it is possible to reduce the number of times the recording device performs the overwriting. In other words, it is possible to reduce the number of times the recording device records the substitution information in the POW information management area on the recording medium.

Here, overwriting means writing of data into the area on a recording medium which area already contains data. However, the recording medium is a write-once medium and it is impossible to directly update the data. Thus, in practice, the recording device sequentially records the new data in the empty area on the recording medium, and also records the substitution information, to virtually realize the overwriting. The substitution information shows the correspondence between the area where the old data is recorded and the area where the new data is recorded.

If the recording device performs the recording onto the recording medium of pieces of data on the memory area that correspond to recording areas that have been judged as not satisfying the particular condition before performing the recording of pieces of data on the memory area that correspond to recording areas that have been judged as satisfying the particular condition, the following situation might occur. That is, the areas that would have been judged as satisfying the particular condition might be occupied with the pieces of data that correspond to the recording areas that have been judged as not satisfying the particular condition. If this is the case, the writing to the areas that would have been judged as satisfying the particular condition becomes overwriting.

The recording device pertaining to the present invention with the stated structure prevents such a situation, and reduces the number of overwrite operations as a whole.

Designation of the one of the recording areas may be made with use of an address thereof, in order to manage a file that is constituted of pieces of data recorded on the recording medium, the recording device may further comprise a file management unit operable to instruct the recording control unit to record, onto the recording medium, an identifier of the file and addresses on the recording medium of the pieces of data that constitutes the file in association with each other, and the judgment unit may judge that the designated recording area does not contain any piece of data if an address of the designated recording area is not included in the addresses recorded on the recording medium.

With the stated structure, the recording control unit records pieces of data that correspond to recording areas whose addresses are not under the management of the file management unit before recording pieces of data that correspond to recording areas whose addresses are under the management of the file management unit. Thus, in the case the pieces of data relating to the file management information are interdependent, the recording device can reduce the possibility of inconsistency in the file system.

The file management information is information that shows the recording position on the recording medium of each of pieces of data constituting a file.

The recording medium may be a sequentially recordable write-once medium, and the judgment unit may judge that the designated recording area satisfies the predeteimined condition if the designated recording area does not contain any piece of data.

With the stated structure, the recording control unit records the pieces of data that correspond to recording areas that do not contain any piece of data, before recording the pieces of data that correspond to recording areas that contain any piece of data. Thus, the recording device can reduce the number of overwrite operations.

The recording medium may be a sequentially recordable write-once medium, designation of the one of the recording areas may be made with use of an address thereof, the recording device may further comprise an address management unit operable to manage an address of a starting position of empty recording areas on the recording medium, the judgment unit may judge that the designated recording area satisfies the predetermined condition if an address of the designated area is equal to or greater than the address of the starting position, and if the judgment unit judges that the designated recording area satisfies the predetermined condition, the recording control unit may record the one of the pieces of data into the designated recording area, and if the judgment unit judges that the designated recording area does not satisfy the predetermined condition, the recording control unit may record the one of the pieces of the data into one of the empty recording areas that follows the designated recording area.

With the stated structure, the recording control unit records all the pieces of data judged as to be recorded in the recording areas whose addresses are equal to or greater than the address of the starting position of the empty recording areas on the recording medium, before recording pieces of data judged as to be recorded in the recording areas whose addresses are smaller than the address of the starting position. Thus, the recording device can reduce the number of overwrite operations and the number of the operations for recording the substitution information into the POW information management area.

The recording device may further comprise a non-volatile memory, wherein the recording control unit may further store the pieces of data corresponding to the recording areas that have been judged negatively by the judgment unit, into the non-volatile memory.

With the stated structure, the recording device records the pieces of data corresponding to the recording areas that have been judged as not satisfying the condition by the judgment unit into the non-volatile memory. Thus, even if the power is shut down due to a power failure or the like and any of interdependent pieces of data are missed, the recording device can restore the data from the non-volatile memory after the power recovery.

Designation of the one of the recording areas may be made with use of an address thereof, the recording device may further comprise an address management unit operable to manage an address of a starting position of empty recording areas on the recording medium, in order to manage a file that is constituted of pieces of data recorded on the recording medium, the recording device may further comprise a file management unit operable to instruct the recording control unit to record, onto the recording medium, file management information that associates an identifier of the file with addresses on the recording medium of the pieces of data, and when any piece of data constituting the file under management of the file management unit is required to be updated, the file management unit may instruct the recording control unit to record the piece of data to be updated into a recording area having an address that is different from the addresses associated with the file under the management of the file management unit, and to record, as the file management information of the file, the identifier of the file and the address of the data to be updated in association with each other.

With the stated structure, the updated data is to be recorded in an area having an address that is different from the address associated with the file under the management of the file management unit. Thus, the recording device can reduce the number of overwrite operations. Accordingly, in the case the recording medium is a sequentially recordable write-once medium for example, the recording device can reduce the number of the operations for recording the substitution information into the POW information management area.

BRIEF DESCRIPTION OF THE DRAWINGS

FIG. 7 explains the actual-write processing of the first embodiment;

EXPLANATIONS OF REFERENCES

Figure 1:
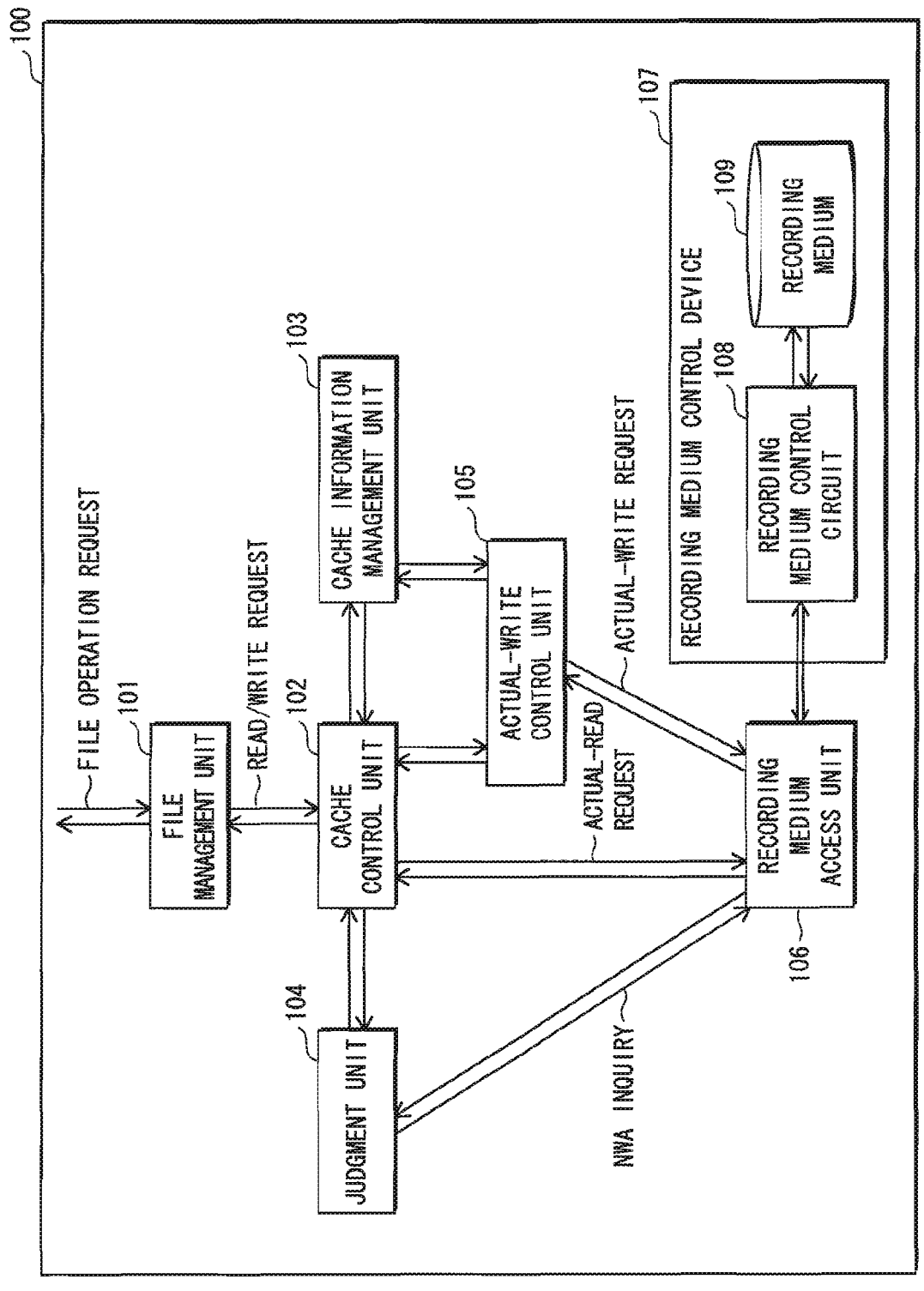
FIG. 1 shows the structure of a recording device 100 of a first embodiment.

100, 1200 recording device
101, 1201 file management unit
102 cache control unit
103 cache information management unit
104 judgment unit
105 actual-write control unit
106 recording medium access unit
107 recording medium control device
108 recording medium control circuit
109 recording medium
201-204 cache information
211 Next
212 Prev
213 dirty bit
214 overwrite bit
215 address
216 cache data
810 FE of root directory
811, 831, 851, 921 AD
820, 840, 930 FID sequence
821 FID of subdirectory
822, 842, 932, 934 ICB
830 FE of subdirectory
841, 931, 933 FID of file
850, 920 FE of file
860, 910 data entity

DETAILED DESCRIPTION OF THE INVENTION

The following explain embodiments of the present invention, with reference to the drawings.

First Embodiment

<Outline>

A recording device 100 pertaining to the first embodiment is a recording device that writes a plurality of pieces of data stored in the disk cache onto a sequentially recordable write-once type recording medium, according to the POW method. This is an improvement from conventional recording devices.

A write-once medium does not accept direct overwriting of data that has been recorded on the medium. Thus, the recording device realizes overwriting of data by writing new data for the overwriting in an empty recording area on the recording medium, and stores substitution information on the recording medium, which shows the correspondence between the address of the area where the old data is recorded and the address of the area where the new data is recorded.

In the case of recoding all the pieces of data stored in the disk cache onto the recording medium, the recording device 100 records pieces of data that have been designated to be written into empty areas onto the recording medium before recording the pieces of data that have been designated to be written into areas that already contain data.

As a result, it is possible to reduce the number of times the recording device 100 performs the overwriting and records the substitution information into the POW information management area.

<Structure>

FIG. 1 shows the structure of the recording device 100 of the first embodiment.

As FIG. 1 shows, the recording device 100 includes a file management unit 101, a cache control unit 102, a cache information management unit 103, a judgment unit 104, an actual-write control unit 105, a recording medium access unit 106 and a recording medium control device 107.

Although not illustrated in FIG. 1, the recording device 100 is equipped with a CPU (Central Processing Unit) and a memory. The functions of the cache control unit 102, the judgment unit 104, the actual-write control unit 105 and the recording medium access unit 106 are realized by the CPU executing programs stored in the memory.

The file management unit 101 receives from a user interface (not illustrated) of the recording device 100 a file operation request, which is a request to create/delete files and directories, or to read/write files. Upon receipt of such a request, the file management unit 101 requests the cache control unit 102 to read data or write data, and executes the file operation according to the received request.

Also, upon receipt of a file creation request, the file management unit 101 assigns, to pieces of data constituting the file, addresses that show recording areas, beginning with the NWA on the recording medium 109 included in the recording medium control device 107. The recording medium 107 is explained below in detail. Note that the file management unit 101 acquires the NWA from the recording medium access unit 106 via the cache control unit 102.

The cache control unit 102 receives from the file management unit 101 a request to write data or a request to read data. Upon receipt of such a request, the cache control unit 102 requests the cache information management unit 103 to write data or read data, and transmits the result of the writing or the read data to the file management unit 101.

Also, in the case the subject data of the request received from the file management unit 101 does not exist in the cache information management unit 103, the cache control unit 102 reads the subject data of the request from the recording medium control device 107 via the recording medium access unit 106, and causes the cache information management unit 103 to store the subject data.

Also, the cache control unit 102 has the function to make an actual-write request that requests the actual-write control unit 105 to write the data stored in the cache information management unit 103 into the recording medium control device 107.

The cache information management unit 103 is a volatile memory that stores cache information that includes cached data, address of the data on the recording medium, and the attribute information of the data. The cache information is explained later.

The cache information management unit 103 writes/reads data according to the request from the cache control unit 102, and reads data according to the request from the cache control unit 105.

The judgment unit 104 judges whether the write request received by the cache control unit 102 will be overwriting or not in the recording medium 109 in the recording medium control device 107. The recording medium 109 is explained later.

The actual-write control unit 105 performs control such that cache data stored in the cache information management unit 103 is recorded in the recording medium control device 107 via the recording medium access unit 106, according to an actual-write request from the cache control unit 102.

The recording medium access unit 106 receives an actual-read request from the cache control unit 102 or an actual-write request from the actual write control unit 105. Upon receipt of such a request, the recording medium access unit 106 issues, to the recording medium control device 107, a command corresponding to the actual-read request or the actual-write request, and reads data from the recording medium control device 107 or writes data in the recording medium control device 107. Also, upon receipt of a request to acquire the NWA, the recording medium access unit 106 sends an inquiry to the recording medium control device 107, and transmits the acquired NWA to the request source.

The recording medium control device 107 is a so-called drive device, and includes a recording medium control circuit 108 and a recording medium 109.

The recording medium control circuit 108 is a circuit for controlling data read from or data write to the recording medium 109.

The recording medium 109 is a sequentially recordable write-once type medium. The recording medium 109 is a common recording medium, and writing onto the recording medium 109 is performed with use of the POW recording method.

The recording medium 109 includes two areas, namely a data area and a POW information management area. Pieces of data are sequentially recordable into both of the areas. The data area stores therein actual data, such as pieces of data constituting a file. The POW information management area stores therein the substitution information.

<Data>

Figure 2:
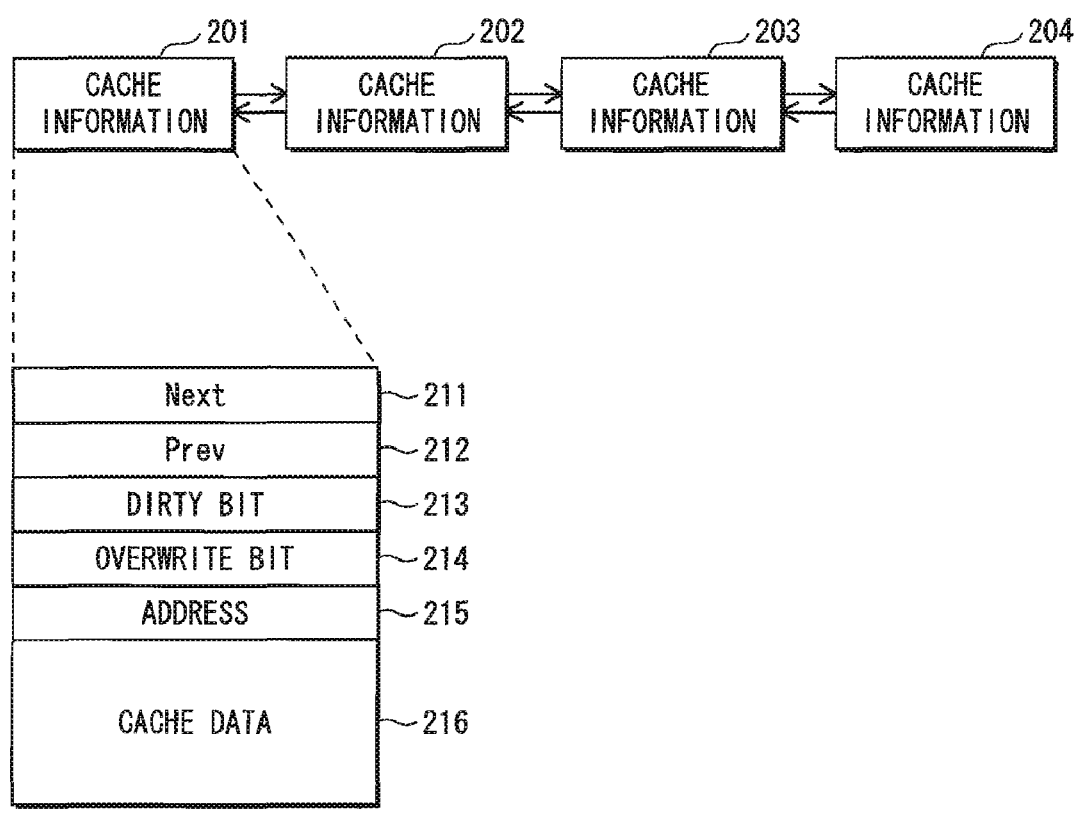
FIG. 2 explains cache information of the first embodiment.

FIG. 2 shows pieces of cache information to be stored in the cache information management unit 103.

As FIG. 2 shows, each of the pieces of cache information 201-204 has a list structure. Each of the pieces of cache information 201-204 includes Next 211, Prev 212, a dirty bit 213, an overwrite bit 214, an address 215 and cache data 216.

The Next 211 is a pointer that indicates an address where the next piece of cache information is recorded in the disk cache. The Prev 212 is a pointer that indicates an address where the previous piece of cache information is recorded in the disk cache.

The Next 211 of the cache information 201 indicates the address on the disk cache of the cache information 202, and the Prev 212 of the cache information 202 indicates the address on the disk cache of the cache information 201.

The dirty bit 213 is one-bit data showing whether the stored cache data is dirty or clean. If the cache data is dirty, the dirty bit 213 is "1", and if the cache data is clean, the dirty bit 213 is "0".

Here, if the cache data is dirty, it means that the stored cache data has a difference from the corresponding data recorded on the recording medium 109. If the cache data is clean, it means that the stored cache data has no difference. If the data read from the recording medium 109 has been updated, the data is dirty.

The overwrite bit 214 is one-bit data that shows whether the recording of the stored cache data onto the recording medium 109 is overwriting or not. If it is overwriting, the overwrite bit 214 is "1". If it is not overwriting, the overwrite bit 214 is "0".

The address 215 is an address on the recording medium 109 indicating where the cache data is to be recorded.

The cache data 216 is actually cached data. The size of the cache data is a multiple of a unit size of recording, and reading and writing of the recording medium. For example, the cache data size is a block size, a sector size, or an ECC (Error Correction Code) block size. In the following explanation, it is assumed that the cache data size is the sector size.

Although FIG. 2 depicts an example including four pieces of cache information, another piece of cache information may be added within the range of the storage capacity of the cache information management unit 103. Also, it is possible to delete some of the pieces of cache information.

At addition or deletion of cache information, it is possible to maintain the list structure by updating the Next 211 and the Prev 212.

<Operations>

The following explains operations of the recording device 100 that has the stated structure and handles the stated data.

Firstly, to explain how pieces of cache data are accumulated in the cache information management unit 103, the following explains the case where the file management unit 101 requests the cache control unit 102 to read data or write data.

<Data Reading>

Figure 3:
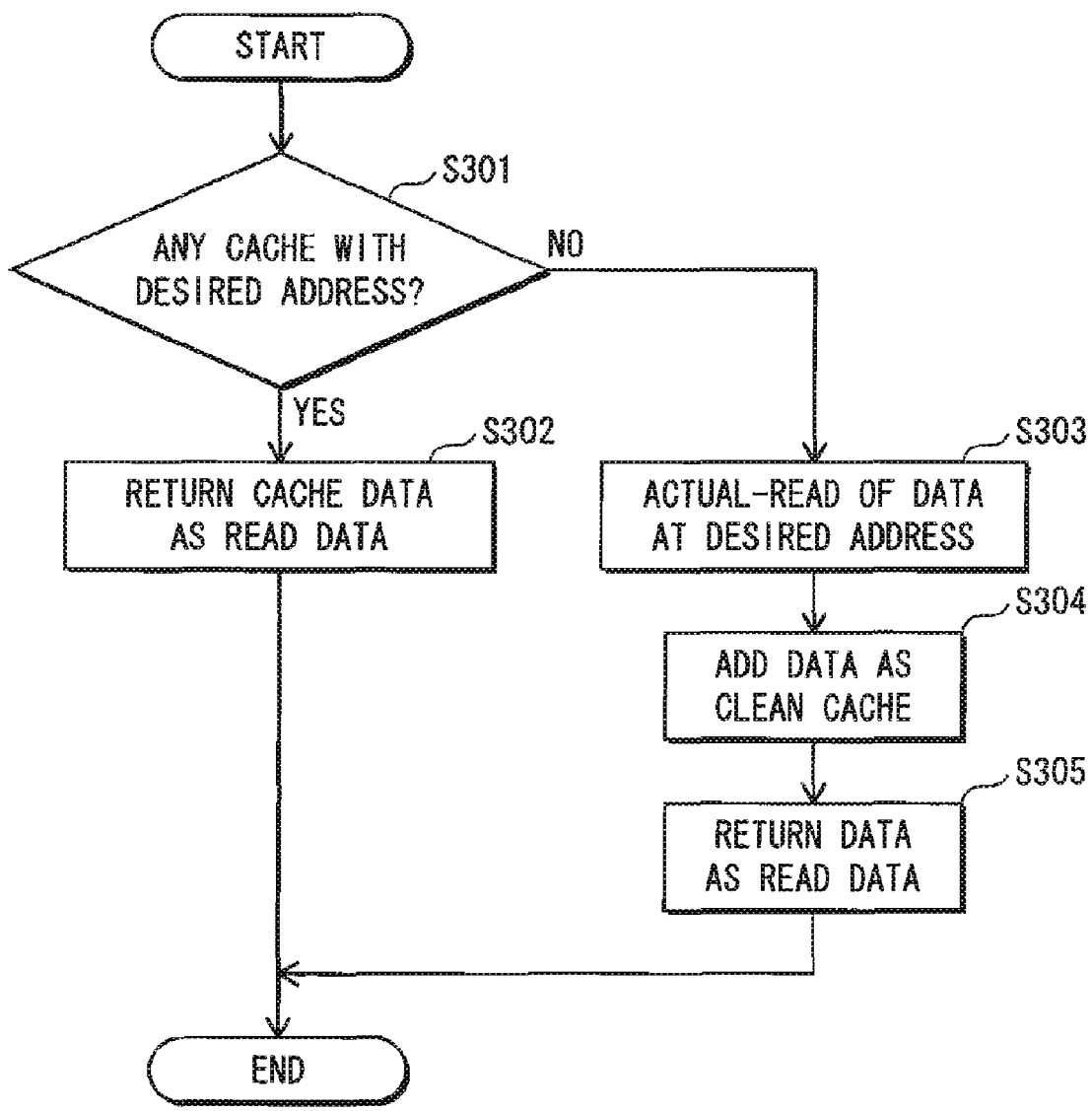
FIG. 3 is a flowchart showing read processing of the first embodiment.

The following explains operations of the recording device 100 in the case the file management unit 101 requests the cache control unit 102 to read data, with reference to FIG. 3.

In the following explanation, it is assumed that the subject address of the read request is ADRread, which is address data that specifies a sector on the recording medium 109.

Upon receipt of a request to read data recorded at the address ADRread from the file management unit 101, the cache control unit 102 inquires of the cache information management unit 103 about whether cache data whose address is the same as the ADRread exists or not (Step S301).

The cache information management unit 103 refers to the address 215 of each piece of cache information stored therein. If the address 215 of any piece of the cache information is the same as the ADRread (Step S301: Yes), the cache information management unit 103 transmits the cache data of the cache information whose address 215 is the same as the ADRread.

The cache control unit 102 transmits the cache data received from the cache information management unit 103, as data whose address is recorded as the ADRread, to the file management unit 101 (Step S302). Thus, the reading processing completes.

If the address 215 of none of the pieces of cache information is the same as the ADRread (Step S301: No), the cache information management unit 103 transmits information showing the fact to the cache control unit 102.

The cache control unit 102 makes an actual-read request to the recording medium access unit 106 (Step S303). The actual-read request is a request for reading data stored at the ADRread from the recording medium control device 107.

The recording medium access unit 106, which has received the actual-read request, issues a command that corresponds to the actual-read request, to the recording medium control device 107. The recording medium access unit 106 reads the data recorded at the ADRread from the recording medium control device 107, and transmits the read data to the cache control unit 102. In the following explanation, the data read through the actual-read mentioned above is called "DATread".

The cache control unit 102 requests the cache information management unit 103 to add, as a clean cache, a piece of cache information whose address is the ADRread and cache data is the DATread.

The cache information management unit 103 adds a piece of cache information whose dirty bit 213 is "0", address 215 is the ADRread, and cache data 216 is the DATread (Step S304).

The cache control unit 102 transmits the data DATread received from the recording medium access unit 106 to the file management unit 101, as data recorded at the address ADRread (Step S305). Thus the reading processing completes.

<Data Writing>

Figure 4:
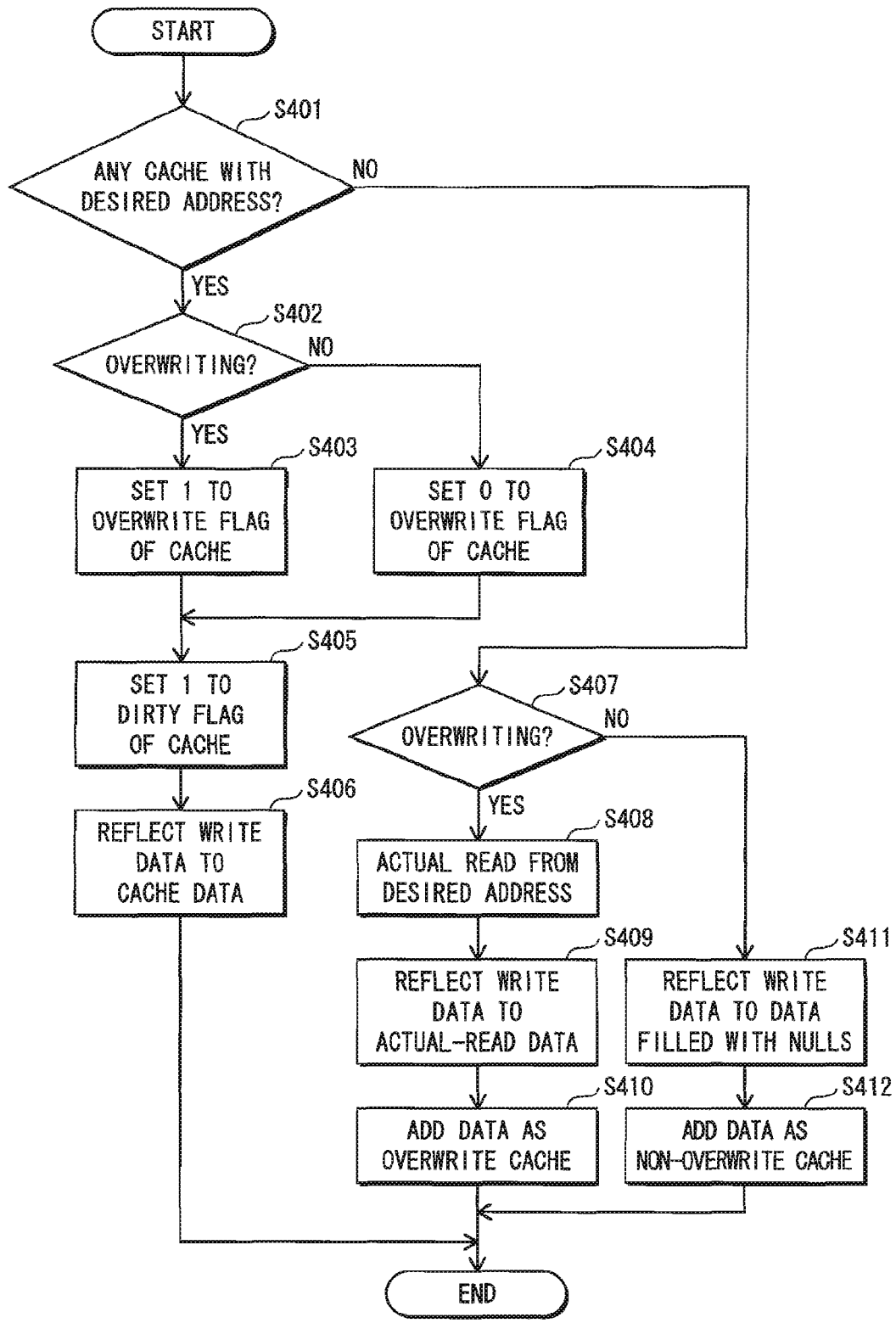
FIG. 4 is a flowchart showing write processing of the first embodiment.

The following explains operations of the recording device 100 in the case the file management unit 101 requests the cache control unit 102 to write data, with reference to FIG. 4.

In the following explanation, it is assumed that the subject address of the write request is ADRwrite, and the subject data of the write request is DATwrite. Here, the ADRwrite is an address that is assigned by the file management unit 101 and specifies any one of the sectors on the recording medium 109 that follow the NWA.

Upon receipt of a request to write data at the address ADRwrite from the file management unit 101, the cache control unit 102 inquires of the cache information management unit 103 about whether cache data whose address is the same as the ADRwrite exists or not (Step S401).

The cache information management unit 103 refers to the address 215 of each piece of cache information stored therein. If the address 215 of any piece of the cache information is the same as the ADRwrite (Step S401: Yes), the cache information management unit 103 transmits information showing the fact to the cache control unit 102.

The cache control unit 102 inquires of the judgment unit 104 about whether the requested writing to the address ADRwrite is overwriting or not (Step S402).

The judgment unit 104 judges whether the writing is overwriting or not according to the processing procedures shown in FIG. 5, which is explained later, and transmits the result of the judgment to the cache control unit 102.

If the writing is overwriting (Step S402: Yes), the cache control unit 102 requests the cache information management unit 103 to set the piece of cache information whose address is ADRwrite to indicate overwriting.

The cache information management unit 103 sets "1" to the overwrite bit 214 of the piece of cache information whose address 215 is the ADRwrite, which is included in the pieces of cache information stored therein (Step S403).

If the writing is not overwriting (Step S402: No), the cache control unit 102 requests the cache information management unit 103 to set the piece of cache information whose address is ADRwrite not to indicate overwriting.

The cache information management unit 103 sets "0" to the overwrite bit 214 of the piece of cache information whose address 215 is the ADRwrite, which is included in the pieces of cache information stored therein (Step S404).

The cache control unit 102 requests the cache information management unit 103 to update the cache data of the piece of cache information whose address is ADRwrite to DATwrite as a dirty cache.

The cache information management unit 103 sets "1" to the dirty bit of the piece of cache information whose address 215 is the ADRwrite, which is included in the pieces of cache information stored therein (Step S405), and updates the cache data 216 to the DATwrite (Step S406). Thus the writing processing completes.

The cache information management unit 103 refers to the address 215 of each piece of cache information stored therein. If the address 215 of none of the pieces of cache information is the same as the ADRwrite (Step S401: No), the cache information management unit 103 transmits information showing the fact to the cache control unit 102.

The cache control unit 102 inquires of the judgment unit 104 about whether the requested writing to the address ADRwrite is overwriting or not (Step S407).

The judgment unit 104 judges whether the writing is overwriting or not according to the processing procedures shown in FIG. 5, which is explained later, and transmits the result of the judgment to the cache control unit 102.

If the writing is overwriting (Step S407: Yes), the cache control unit 102 makes an actual-read request to the recording medium access unit 106 (Step S408). The actual-read request is a request for reading data stored at the ADRwrite on the recording medium 109.

The recording medium access unit 106 issues a command that corresponds to the actual-read request, to the recording medium control device 107. The recording medium access unit 106 reads the data recorded at the ADRwrite from the recording medium control device 107, and transmits the read data to the cache control unit 102. The cache control unit 102 overwrites the data, which has been read through the actual reading, with the DATwrite (Step S409), and requests the cache information management unit 103 to add a piece of cache information as a dirty cache that indicates overwriting.

According to the request from the cache control unit 102, the cache information management unit 103 adds a pieces of cache information whose dirty bit 213 is "1", overwrite bit 214 is "1", address 215 is the ADRwrite, and cache data 216 is the DATwrite (S410). Thus the writing processing completes.

If the requested writing is not overwriting (Step S407: No), the cache control unit 102 prepares data filled with nulls, having the same size as the cache data size (i.e. the sector size) of the cache information, and updates the DATwrite with the prepared data (Step S411). The cache control unit 102 requests the cache information management unit 103 to add a piece of cache information as a dirty cache that does not indicate overwriting.

According to the request from the cache control unit 102, the cache information management unit 103 adds a pieces of cache information whose dirty bit 213 is "1", overwrite bit 214 is "0", address 215 is the ADRwrite, and cache data 216 is the DATwrite (S412). Thus the writing processing completes.

<Overwrite Judgment>

Figure 5:
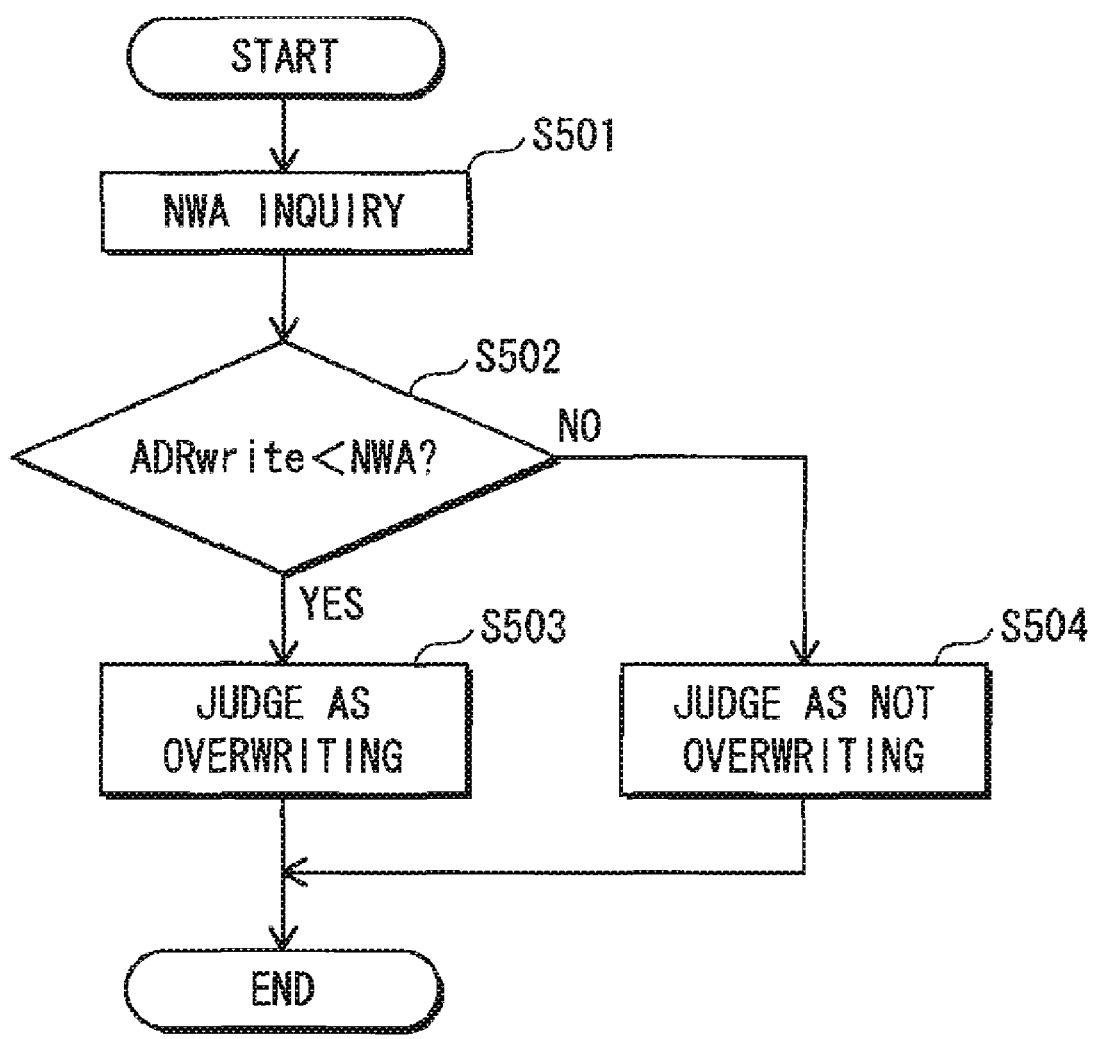
FIG. 5 is a flowchart showing overwrite processing of the first embodiment.

The following explains the operations performed by the judgment unit 104 to judge whether the requested writing is overwriting or not, with reference to FIG. 5.

In the following explanation, it is assumed that the subject address of the writing is ADRwrite. Note that the ADRwrite is an address that is assigned by the file management unit 101 and specifies a sector on the recording medium 109. Upon receipt of the inquiry about whether the requested writing to the ADRwrite is overwriting or not from the cache control unit 102, the judgment unit 104 inquires of the recording medium access unit 106 about the NWA (Step S501).

Upon receipt of the NWA from the recording medium access unit 106, the judgment unit 104 compares the received NWA with the ADRwrite (Step S502). If the ADRwrite is smaller than the NWA (Step S502: Yes), the judgment unit 104 judges that the writing is overwriting (Step S503), and if the ADRwrite is equal to or greater than the NWA (Step S502: No), the judgment unit 104 judges that the writing is not overwriting (Step S504).

The judgment unit 104 transmits the judgment result to the cache control unit 102, and completes the overwrite judgment.

<Actual Write of Data>

The following explains operations performed by the file management unit 101 for recording the dirty cache information accumulated in the cache information management unit 103 onto the recording medium 109 by making a write request to the cache control unit 102 as described above, with reference to FIG. 6.

Note that the recording to the recording medium 109 is performed when a request to add a new piece of cache information is made in the case the cache information management unit 104 stores therein pieces of cache information to the full capacity thereof, or when the file system is unmounted.

The following explains the case where all the pieces of dirty cache data stored in the cache information management unit 103 are recorded onto the recording medium 109 in the case of the unmounting of the file system.

When the necessity of recording onto the recording medium 109 arises, the cache control unit 102 requests the actual-write control unit 105 to perform actual writing of the dirty cache data. The actual-write control unit 105 inquires of the cache information management unit 103 about whether any piece of dirty cache data not indicating overwriting exist (Step S601).

The cache information management unit 103 refers to each piece of cache information to check whether there are any piece of cache information that have the overwrite bit "0" and the dirty bit "1". The cache information management unit 103 transmits the judgment result to the actual-write control unit 105.

If there are any pieces of dirty cache data not indicating overwriting (Step S601: Yes), the actual-write control unit 105 receives one of such pieces of dirty cache data that is to be recorded at the NWA, from the cache information management unit 103 (Step S602). In the following explanation, it is assumed that the received cache data is DATwrite and the address is ADRwrite.

The actual-write control unit 105 requests the recording medium access unit 106 to perform the actual writing with use of the DATwrite as the cache data and the ADRwrite as the address.

Upon receipt of the actual-write request, the recording medium access unit 106 issues a command that corresponds to the actual-write request, to the recording medium control device 107. The recording medium control circuit 108, included in the recording medium control device 107, records the DATwrite at the ADRwrite on the recording medium 109 (Step S603).

On completion of the recording onto the recording medium 109, the actual-write control unit 105 requests the cache information management unit 103 to set the cache information for the cache data DATwrite recorded on the recording medium 109 to indicate a clean cache.

The cache information management unit 103 sets "0" to the dirty bit of the cache information for the cache data DATwrite recorded on the recording medium 109 (Step S604).

Step S601 to Step S604 will be repeated while there are any pieces of dirty cache data not indicating overwriting. Such pieces of dirty cache data are to be recorded one by one onto the recording medium 109 and changed to clean caches.

If there is no piece of dirty cache data not indicating overwriting (Step S601: No), the actual-write control unit 105 inquires of the cache information management unit 103 about whether any piece of dirty cache data indicating overwriting exist (Step S605).

The cache information management unit 103 refers to each piece of cache information to check whether there are any pieces of cache information that have the overwrite bit "1" and the dirty bit "1". The cache information'management unit 103 transmits the judgment result to the actual-write control unit 105.

If there are any pieces of dirty cache data indicating overwriting (Step S605: Yes), basically the same Steps as Step S602 to S604 are performed for such pieces of dirty cache data (Step S606 to Step S608).

However, in Step S606, the actual-write control unit 105 receives an arbitrary one of the pieces of dirty cache data indicating overwriting.

Also, in Step S607, the recording medium access unit 106, which has received the actual-write request, issues a command that corresponds to the actual-write request, to the recording medium control device 107. The recording medium control circuit 108, included in the recording medium control device 107, records the DATwrite at the NWA on the recording medium 109, and records substitution information showing "ADRwrite→NWA" in the POW information management area on the recording medium 109.

Step S605 to Step S608 will be repeated while there are any pieces of dirty cache data indicating overwriting. Such pieces of dirty cache data are to be recorded one by one onto the recording medium 109 and changed to clean caches.

Finally, when there is no piece of dirty cache indicating overwriting (Step S605: No), the actual-write processing completes.

Through the series of actual-write processing procedures, pieces of cache data that indicate overwriting are recorded after all the pieces of cache data that do not indicate overwriting. Thus, the number of overwrite operations can be reduced.

<Specific Operations for Actual Writing of Data>

The following specifically explains the operations for actual writing of data described above, with reference to an example shown in FIG. 7.

Figure 6:
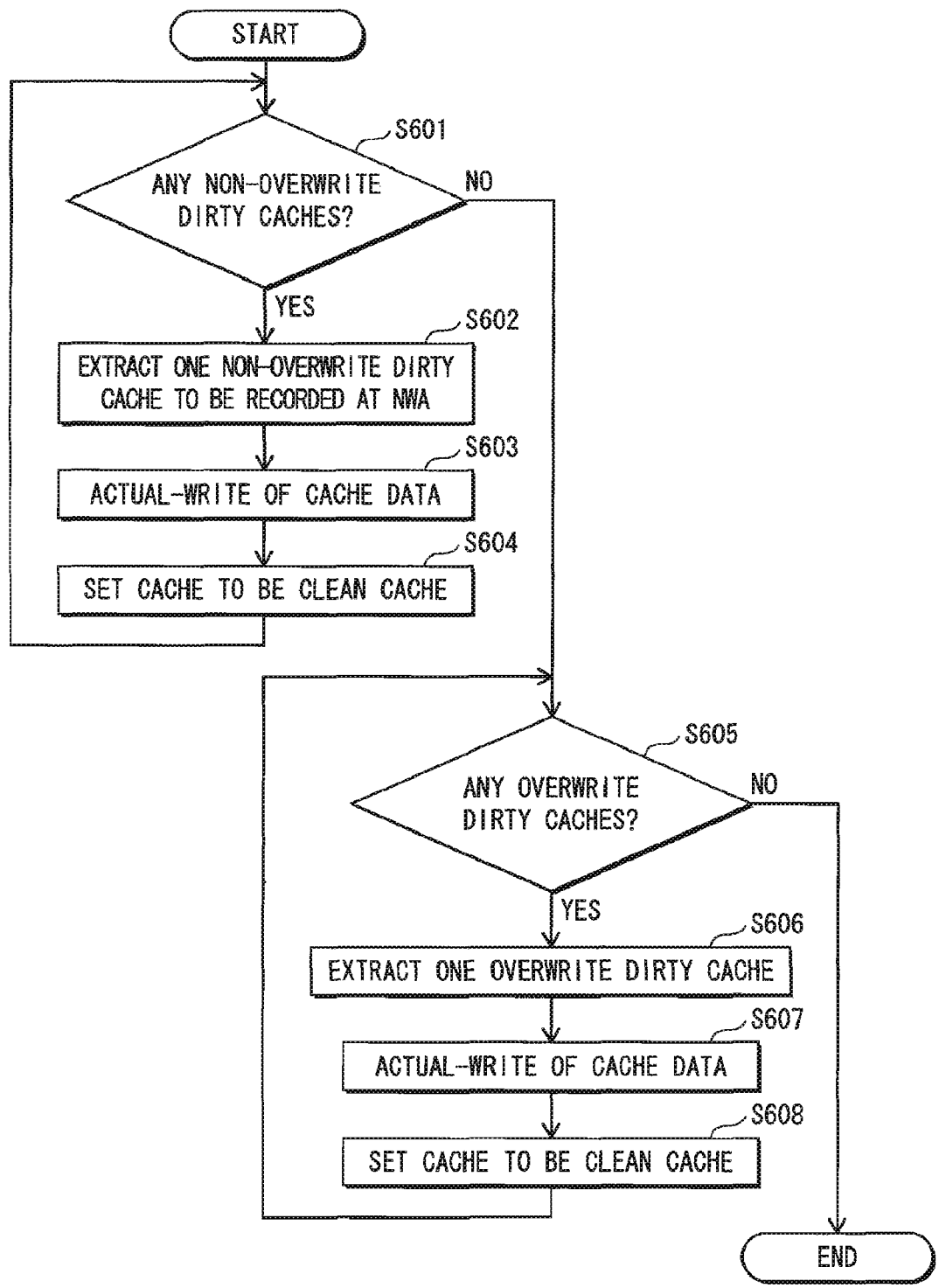
FIG. 6 is a flowchart showing actual-write processing of the first embodiment.

FIG. 7 shows an example case of recording where pieces of dirty cache data "A", "B", "C" and "D", which are stored in the cache information management unit 103, are recorded onto the recording medium 109 in the POW method, according to the flowchart of FIG. 6. The recording medium 109 is a sequentially recordable write-once type recording medium.

In FIG. 7, it is assumed that the recording medium 109 includes recording areas identified by addresses 1 to 10 respectively, and in the state where the state number 701 is (1), the areas corresponding to the addresses 1 to 5 already contain data, and the areas corresponding to the addresses 6 to 10 are empty.

In the drawing, the state number 701 is a number for explaining the state. A dirty cache 1402 shows a state of each piece of dirty cache data remaining on the disk cache. A recording medium 703 shows a state of each piece of data recorded on the recording medium 109.

The numbers shown in the dirty cache 702 are addresses on the recording medium 109, which are used for recording the pieces of dirty cache data onto the recording medium 109. These addresses are assigned by the file system.

If the state number 701 is (1), the state is the initial state where the disk cache stores: dirty cache data "A" which is to be recorded at the address 2 on the recording medium; dirty cache data "B" which is to be recorded at the address 4; dirty cache data "C" which is to be recorded at the address 6; and dirty cache data "D" which is to be recorded at the address 7.

When the necessity of recording onto the recording medium 109 arises, the cache control unit 102 requests the actual-write control unit 105 to perform actual writing of the dirty cache data. The actual-write control unit 105 inquires of the cache information management unit 103 about whether any piece of dirty cache data not indicating overwriting exist (Step S601).

In the state where the state number 701 is (1), since there are pieces of dirty cache data "C" and "D" whose respective recording target addresses on the recording medium 109 are equal to or greater than the NWA, the cache information management unit 103 transmits this judgment result to the actual-write control unit 105. Note that in the case where the state number 701 is (1), the NWA is 6.

Since there are pieces of dirty cache data not indicating overwriting (Step S601: Yes), the actual-write control unit 105 receives, among such pieces of dirty cache data, the dirty cache data "C" that is to be recorded at the NWA, from the cache information management unit 103 (Step S602). The actual-write control unit 105 requests the recording medium access unit 106 to perform the actual writing with use of the cache data "C" and the address "6".

Upon receipt of the actual-write request, the recording medium access unit 106 issues a command that corresponds to the actual-write request, to the recording medium control device 107. The recording medium control circuit 108, included in the recording medium control device 107, records the cache data "C" at the address "6" on the recording medium 109 (Step S603).

On completion of the recording of the cache data "C" onto the recording medium 109, the actual-write control unit 105 requests the cache information management unit 103 to set the cache information for the cache data "C" recorded on the recording medium 109 to indicate a clean cache.

The cache information management unit 103 sets "0" to the dirty bit of the cache information for the cache data "C" recorded on the recording medium 109 (Step S604)

Through the stated processing procedures, in the state where the state number 701 is (2), the cache data "C" disappears from the dirty cache 702, and the cache data "C" is recorded at the address 6 in the recording medium 703, and the NWA is changed to the address 7.

Since the cache data "D" still remains as the dirty cache data that does not indicate overwriting (Step S601: Yes), the recording medium control circuit 108 records the cache data "D" at the NWA (i.e. the address 7) on the recording medium 109, and the cache information management unit 103 sets the cache data "D" to be clean cache data (Steps S602 to S604), in the same manner as described above.

Through these procedures, in the state where the state number 701 is (3), the cache data "D" disappears from the dirty cache 702, and the cache data "D" is recorded at the address 7 in the recording medium 703, and the NWA is changed to the address 8.

Since there is no longer any dirty cache that does not indicate overwriting (Step S601: No), the actual-write control unit 105 inquires of the cache information management unit 103 about whether any piece of dirty cache data indicating overwriting exist (Step S605).

In the state where the state number 701 is (3), since there are pieces of dirty cache data "A" and "B" whose respective recording target addresses on the recording medium are smaller than the NWA, the cache information management unit 103 transmits this judgment result to the actual-write control unit 105.

Since there are pieces of dirty cache data indicating overwriting (Step S605: Yes), the actual-write control unit 105 receives, among such pieces of dirty cache data, the dirty cache data "A" from the cache information management unit 103 (Step S606)

The actual-write control unit 105 requests the recording medium access unit 106 to perform the actual writing with use of the cache data "A" and the address "2".

Upon receipt of the actual-write request, the recording medium access unit 106 issues a command that corresponds to the actual-write request, to the recording medium control device 107. The recording medium control circuit 108, included in the recording medium control device 107, records the cache data "A" at the address "8" on the recording medium 109 (Step S607), and records substitution information showing "address 2→address 8" in the POW information management area on the recording medium 109.

Here, since pieces of the substitution information are sequentially recorded in the POW information management area, the same data can be overwritten plural times in some cases. For example, two pieces of the substitution information, such as "address 2→address 3" and "address 2→address 8", can be recorded. If the data read request is made in such a case, the substitution information "address 2→address 8", which has been recorded later than the other, will be referred to.

On completion of the recording of the cache data "A", the actual-write control unit 105 requests the cache information management unit 103 to set the cache information for the cache data "A" recorded on the recording medium 109 to indicate a clean cache.

The cache information management unit 103 sets "0" to the dirty bit of the cache information for the cache data "A" recorded on the recording medium 109 (Step S608).

Through the stated processing procedures, in the state where the state number 701 is (4), the cache data "A" disappears from the dirty cache 702, the cache data "A" is recorded at the address 8 in the recording medium 703, the substitution information "address 2→address 8" is recorded in the POW information management area, and the NWA is changed to the address 9.

Since the cache data "B" still remains as the dirty cache data that indicates overwriting (Step S605: Yes), the recording medium control circuit 108 records the cache data "B" at the NWA (i.e. the address 9) on the recording medium 109 and records the substitution information "address 2→address 8" in the POW information management area. The cache information management unit 103 sets the cache data "B" to be clean cache data (Steps S606 to S608), in the same manner as described above.

Through these procedures, in the state where the state number 701 is (5), the cache data "B" disappears from the dirty cache 702, the cache data "B" is recorded at the address 9 in the recording medium 703, the substitution information "address 4→address 9" is recorded in the POW information management area, and the NWA is changed to the address 10.

In this embodiment, the substitution information (e.g. "address 2→address 8" and "address 4→address 9" described above) is created for each recording area that requires overwriting. However, such a structure is not necessary. For example, the replacement information may be created based on the length of each recording area.

For example, under the state where the state number 701 in FIG. 7 indicates (1), assume the case where there are pieces of dirty cache data that each indicate overwriting and should be respectively written into the recording areas identified by the addresses 2 and 4, and there also pieces of dirty cache data that each do not indicate overwriting and should be respectively written into the recording areas identified by the addresses 6 and 7. According to the embodiment described above, pieces of substitution information "address 2→address 8", "address 3→address 9", "address 4→address 10" are separately created. However, using the start address of the area that requires overwriting and the data length, it is possible to create the substitution information. For example, the substitution information may be represented as follows: "address 2, the length from the recording address 2 to the end address of the area identified by the address 4 address 8, the length from the address 2 to the end address of the recording area identified by the address 4". With this structure, in the case where continuous recording areas are the targets of overwriting, it is possible to create the substitution information with a smaller data amount. Further, if the sizes (data lengths) of the recording areas respectively identified by the addresses on the recording medium are determined to be the same, it is possible to more easily calculate the data lengths identified with in the substation information (i.e. it is possible to calculate the data lengths by multiplying the size (the data length) of a single recording area by the number of the continuous recording areas as the targets of the overwriting).

<Consideration>

As explained above, in the case the recording onto the recording medium 109 is performed according to the flowchart of FIG. 6, the pieces of cache data "C" and "D", which did not indicate overwriting when written in the cache information management unit 103, are actually recorded onto the recording medium 109 as non-overwrite data. This reduces the number of overwrite operations onto the recording medium 109.

With the technology pertaining to the present invention, unlike the conventional art explained with reference to FIG. 14, it never happens that the pieces of cache data "C" and "D", which were recognized as non-overwrite data when they were written in the cache information management unit 103, will be recorded onto the recording medium 109 as overwrite data contrarily. In comparison between the state where the state number 1401 is (5) in FIG. 14 and the state where the state number 701 is (5) in FIG. 7, FIG. 7 pertaining to the present invention shows that the number of overwrite operations is minimized, and the number of the pieces of substitution information is minimized accordingly.

Since the substitution information is minimized, it is possible to delay the due to the capacity shortage of the POW information management area for recording the substitution information, which causes writing failure. Also, it is possible to prevent decrease in the reading processing speed at the data reading, because the number of times the substation information is referred to.

In addition to the advantageous effect explained above, there is a second effect that it is possible to reduce the possibility of inconsistency in the file system, which can be caused at power shutdown. The present invention achieve this effect by recording pieces of cache data not indicating overwriting before recording pieces of cache data indicating overwriting.

Firstly, as a precondition for explaining the second effect, the following explains access to files on a recording medium and recording of files onto a recording medium according to the UDF, which is applied to BD-R and so on.

According to the UDF, at recording of a file onto a recording medium, a data entity as actual data of the file and positional information that shows the position of the data entity on the recording medium are recorded onto the recording medium. This enables the file access.

<File Access According to the UDF>

Figure 8:
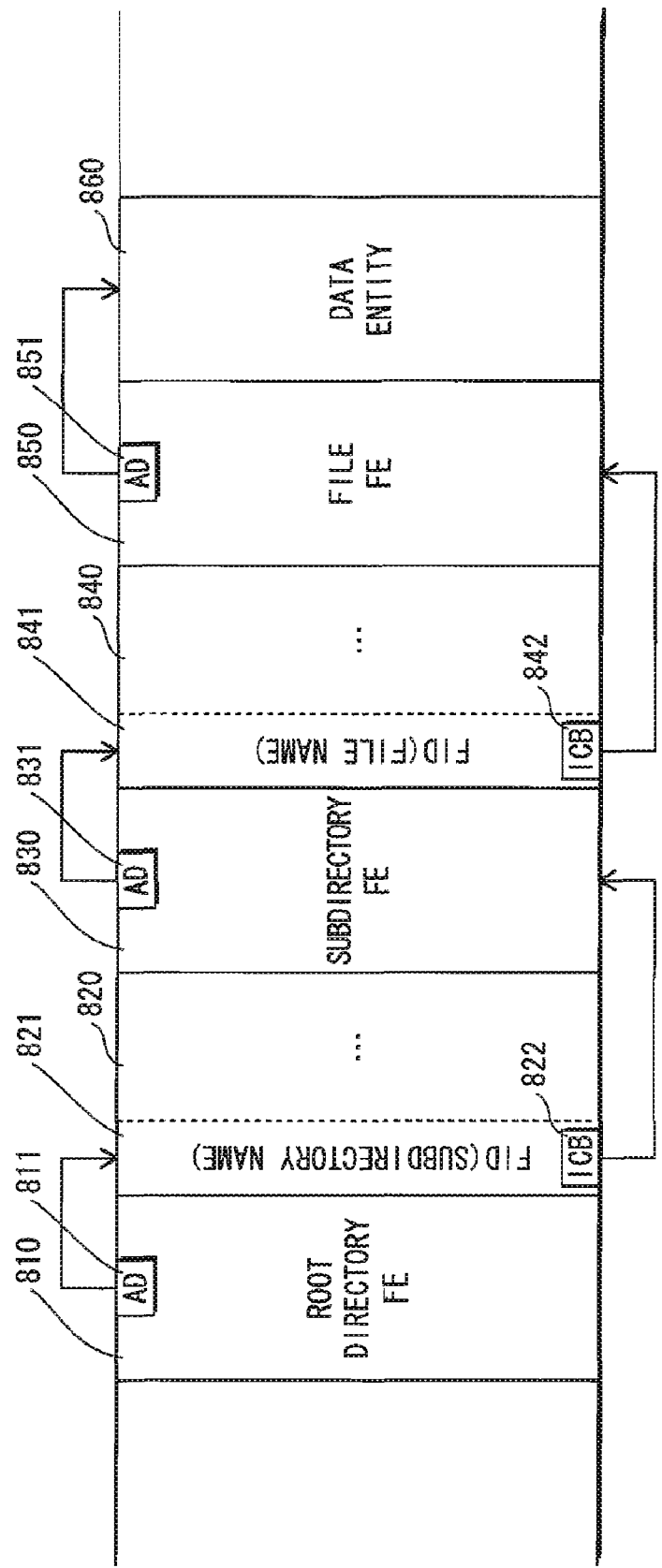
FIG. 8 explains processing for accessing files recorded on a recording medium according to the UDF.

The following explains an example of access to a file in a subdirectory under the root directory, with reference FIG. 8.

On occurrence of a file access request, the file system refers to an area (not illustrated) for storing volume information on the disc, and reads an FE (File Entry) 810 of the root directory.

The FE 810 of the root directory includes an AD (Allocation Descriptor) 811, which is information showing the position on the recording medium 109 of the FID (File Identifier Descriptor) sequence 820 for directories and files under the root directory.

The file system refers to the AD 811 included in the FE 810 of the root directory that the file system has read, and reads the FID sequence 820.

The FID sequence 820 includes FIDs of directories and files under the root directory. Each FID includes information showing the names of directories and files, and an ICB (Information Control Block) which is information showing the position on the recording medium 109 of the FEs of the directories and the files.

The file system reads an FID 821 of a subdirectory from the FID sequence 820, refers to an ICB 822 included in the FID 821, and reads an FE 830 of the subdirectory.

The FE 830 of the subdirectory includes an AD 831, which is information showing the position on the recording medium 109 of the FID sequence 840 for directories and files under the subdirectory.

The file system refers to the AD 831 included in the FE 830 of the subdirectory that the file system has read, and reads the FID sequence 840.

The FID sequence 840 includes FIDs of directories and files under the subdirectory, in the same manner as the FID sequence 820.

The file system reads an FID 841 of a data entity from the FID sequence 840, refers to an ICB 842 included in the FID 841, and reads an FE 850 of the file.

The FE 850 in the file includes an AD 851, which is information showing the position on the recording medium 109 of the data entity of the file as the access target.

The file system refers to the AD 851 included in the FE 850 of the file that the file system has read, and reads a data entity 860.

In this way, it is possible to realize the access to the data entity as the entity of the file.

<File Recording According to the UDF>

Figure 9:
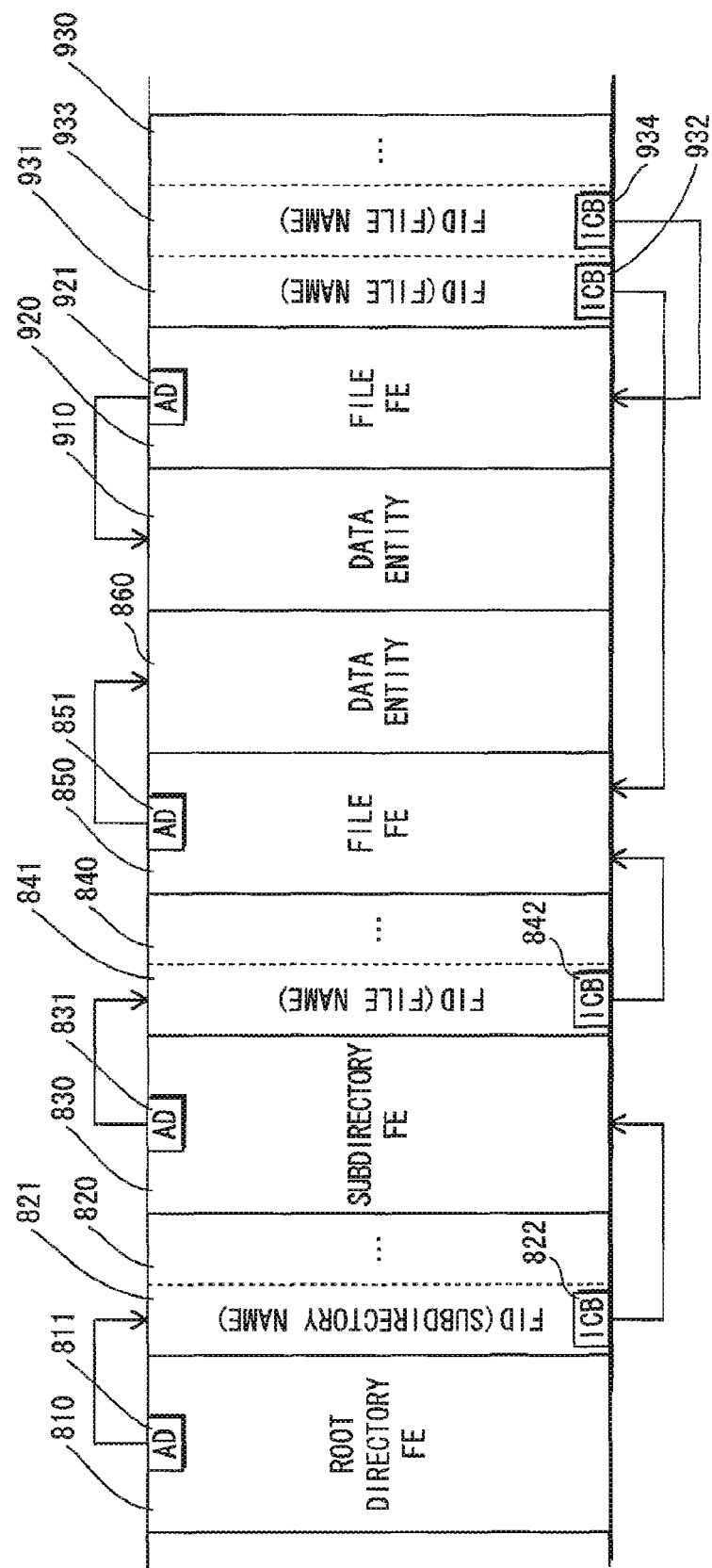
FIG. 9 explains processing for recording files onto a recording medium according to the UDF.

The following explains an example of recording of a new file in the same directory as the file explained above is recorded, with reference FIG. 9.

The file system records a data entity 910 as an entity of the new file onto the recording medium 109. Since the recording medium 109 is a sequentially recordable write-once type medium, the file system records the data entity 910 in the area indicated by the NWA on the recording medium 109.

Note that the NWA has moved to the next area as the data entity 910 has been recorded.

The file system records, at the NWA, an FE 920 of a file that includes an AD 921 which is information showing the position on the recording medium 109 of the data entity 910. The NWA has moved to the next area as the FE 920 has been recorded.

The file system adds an FID for the FE 920 to the FID sequence 840. Here, the file system overwrites the FID sequence 840 to add the FID for the FE 920 to the FID sequence 840.

Thus, in practice, the recording medium control circuit 108 records at the NWA an FID sequence 930 that includes an FID 931 and an FID 933, which respectively correspond to the FE 850 of the data entity 860 and the FE 920 of the data entity 910. Also, the recording medium control circuit 108 records, in the POW information management area on the recording medium 109, a piece of replacement information showing that FID sequence 840 is overwritten with the FID sequence 930.

Note that an ICB 932 included in the FID 931 shows the recording position of the FE 850 for the data entity 860, and an ICB 934 included in the FID 933 shows the recording position of the FE 920 for the data entity 910.

<Explanation of the Second Effect Based on a Specific Example>

The following specifically explains the second effect, with reference to the example of FIG. 7.

Here, it is assumed that all the pieces of dirty cache data "A", "B", "C" and "D" in FIG. 7 are interdependent. Also, the following explanation assumes the case where a file is added into each of two directories.

For example, the dirty cache data "C" includes a data entity of a first file to be added and an FE indicating the data entity. The dirty cache data "D" includes a data entity of a second file to be added and an FE indicating the data entity. The dirty cache data "A" is an FID sequence showing the FE of the file that is to be updated according to the addition of the first file. The dirty cache data "B" is an FID sequence showing the FE of the file that is to be updated according to the addition of the second file.

Since all the pieces of dirty cache data "A", "B", "C" and "D" are interdependent, the file system might fall into an inconsistent state if the power is shut down when even one of the pieces of data has not been recorded onto the recording medium.

Figure 14:
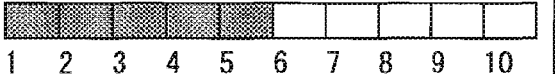
FIG. 14 explains actual-write processing according to a conventional method.

In such a case, in FIG. 14 where the technique pertaining to the present invention is not applied, the file system falls into an inconsistent state if the power is shut down under the conditions where the state number 1401 is any of (2), (3) and (4), because although the updated FID sequence has been recorded, the FE of the file indicating the data entity to be added has not been recorded, and the file system cannot refer to the added file entity.

On the other hand, in FIG. 7 pertaining to the first embodiment of the present invention, the file system does not fall into an inconsistent state under the conditions where the state number 701 is (2) and (3), because although the data entity and the FE of the file have been recorded, the FID sequence has not been recorded. The data entity is recorded in a non-reference area, ant the address of the data entity is not linked with the root directory.

In FIG. 7 pertaining to the first embodiment of the present invention, the file system might fall into an inconsistent state only under the condition where the state number 701 is (4). This shows that the present invention can reduce the possibility of inconsistency in the file system at power shutdown.

Modification Example 1

<Outline>

In the consideration of the first embodiment, it is explained that the recording device 100 pertaining to the first embodiment, compared with the conventional recording device, can reduce the possibility of inconsistency in the file system at power shutdown.

Meanwhile, a recording device pertaining to the modification example 1 completely prevents such inconsistency in the file system by storing all the pieces of cache data for overwriting into a non-volatile memory before recording those pieces of cache data onto the recording medium 109.

<Structure>

The recording device pertaining to the modification example 1 includes a non-volatile memory in addition to the same components as those of the recording device 100 pertaining to the first embodiment. Also, the actual-write control unit 105 of the first embodiment is improved for use in the recording device pertaining to the modification example 1.

The non-volatile memory pertaining to the modification example 1, stores pieces of cache data indicating overwriting and addresses of the recording areas on the recording medium 109 where the pieces of cache data are to be recorded respectively, in one-to-one correspondence.

The actual-write control unit pertaining to the modification example 1 has, in addition to the functions of the actual-write control unit 105 pertaining to the first embodiment, a function to read from the non-volatile memory the pieces of cache data indicating overwriting and record them onto the recording medium 109 in the case the pieces of cache data stored in the cache information management unit 103 has not been normally recorded on the recording medium 109 due to a power failure and so on.

The other components are the same as those of the first embodiment, and their explanations are omitted here.

<Operations>

The following explains the recording device pertaining to the modification example 1 with the stated structure.

Figure 10:
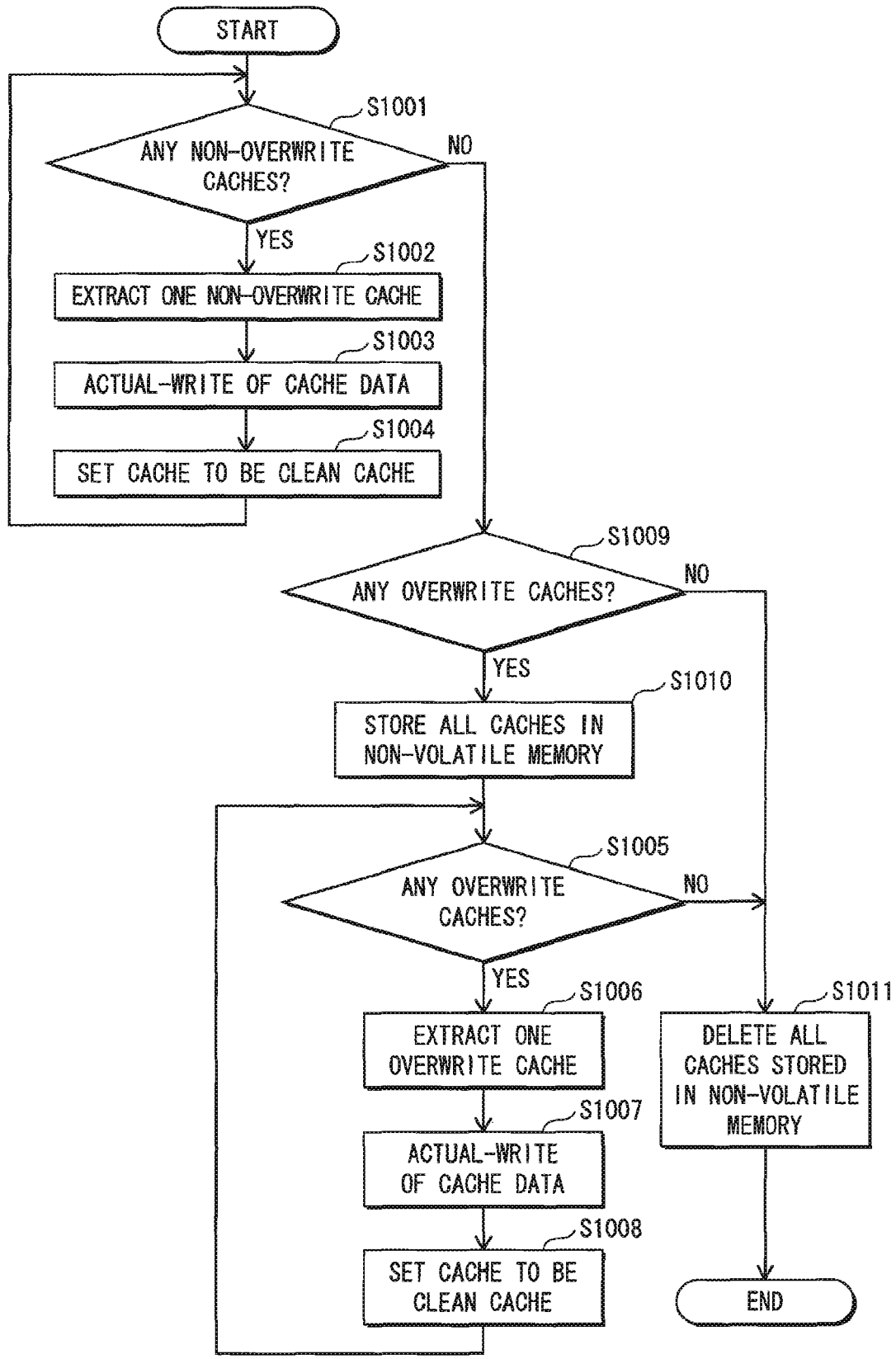
FIG. 10 is a flowchart showing actual-write processing of a modification example 1.

FIG. 10 is a flowchart showing the processing performed by the recording device pertaining to the modification example 1 to record the pieces of cache data stored in the cache information management unit 103 onto the recording medium 109.

In FIG. 10, Step S1009 and S1010 are provided between Step S601 and Step S605 of the flowchart of FIG. 6. Also, Step S1011 is provided as processing for the case it is judged in Step S605 that there is no piece of cache data indicating overwriting.

Since the other Steps are the same as those of the flowchart in FIG. 6, their explanations are omitted here.

In the case where there is any piece of cache data indicating overwriting (Step S1009: Yes), the recording device stores all the pieces of such cache data into the non-volatile memory in one-to-one association with the addresses (Step S1010).

If applied to FIG. 7, this processing is equivalent to storing of the pairs of a piece of cache data indicating overwriting and an address (the cache data "A" and the address 2) (the cache data "B" and the address 4) into the non-volatile memory in the period between when the state number 701 is (3) and when the state number 701 is (4).

In the case power shutdown occurs in the period between when the state number 701 is (2) and when the state number 701 is (3), the file system does not fall into an inconsistent state because only the cache data has been written into the non-reference area. This is explained above in the specific explanation of the second effect of the first embodiment.

In the case where there is no piece of cache data indicating overwriting (Step S1005: No), the recording device deletes all the pieces of data stored in the non-volatile memory (Step S1011). This is because all the pieces of cache data indicating overwriting, stored in the cache information management unit 103, have been normally recorded onto the recording medium 109 through Steps S1006 to S1008, and the data stored in the non-volatile memory has become unnecessary.

The following explains the operations for recording the data stored in the non-volatile memory onto the recording medium 109 when the power supply is restarted after the power shutdown.

Figure 11:
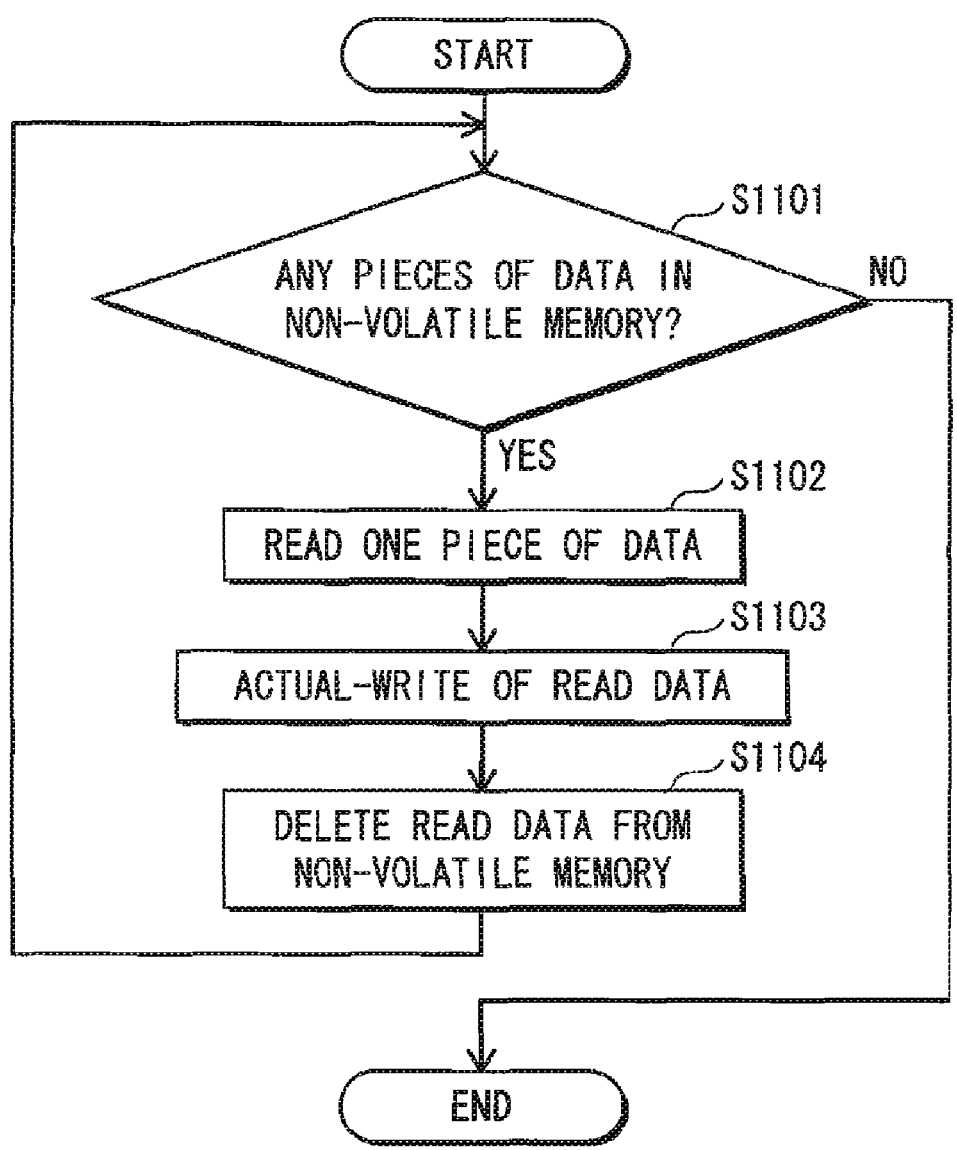
FIG. 11 is a flowchart showing actual-write processing of data stored in a non-volatile memory in the modification example 1.

FIG. 11 is a flowchart showing the operations performed by the actual-write control unit pertaining to the modification example 1 to record the data, stored in the non-volatile memory in Step S1010 of FIG. 1, onto the recording medium 109 when the power supply is restarted after the power shutdown due to a power failure or the like.

When the power supply is restarted after the power shutdown, the actual-write control unit pertaining to the modification example 1 checks whether any data is stored in the non-volatile memory (Step S1101).

If any data is stored in the non-volatile memory (Step S1101: Yes), the actual-write control unit pertaining to the modification example 1 reads a piece of the data from the non-volatile memory (Step S1102).

Here, assume that the read data is DATwrite, and the address of the data is ADRwrite.

The actual-write control unit pertaining to the modification example 1 requests the recording medium access unit 106 to perform actual writing with use of the data DATwrite and the address ADRwrite.

Upon receipt of the actual-write request, the recording medium access unit 106 issues a command that corresponds to the actual-write request, to the recording medium control device 107. The recording medium control circuit 108, included in the recording medium control device 107, records the DATwrite at the ADRwrite on the recording medium 109 (Step S1103).

On completion of the recording onto the recording medium 109, the actual-write control unit pertaining to the modification example 1 deletes the data read from the non-volatile memory (Step S1104).

Steps S1101 to S1104 will be repeated while there are any pieces of data in the non-volatile memory. When there is no data in the non-volatile memory (Step S1101: No), the processing completes.

For example, in the case the power is shutdown when the state number 701 in FIG. 7 is (4) and then the power supply is restarted, there is data in the non-volatile memory (Step S1101: Yes). Thus the actual-write control unit reads the data "A" and the address 2 from the non-volatile memory (Step S1102). The recording medium access unit 106 issues a command that corresponds to the actual-write request, to the recording medium control device 107. The recording medium control circuit 108, included in the recording medium control device 107, records the data "A" at the address 2 (Step S1103).

Note that the writing of the data "A" to the address 2 is overwriting. Thus, in practice, the recording medium control circuit 108 records the data "A" at the address 9, and the substitution information in the POW information management area.

After recording the data "A" at the address 2 on the recording medium 109, the actual-write control unit pertaining to the modification example 1 deletes the data "A" and the address 2 from the non-volatile memory (Step S1104).

The same processing as the above is performed for the data "B" and the address 4 stored in the non-volatile memory (Steps S1101 to S1104).

Since there is no data in the non-volatile memory at this moment, the processing completes.

In this way, it is possible to complete the recording onto the recording medium 109, which was desired before the power shutdown, after the restart of the power supply.

When the state number 701 in FIG. 7 is (4), which is when the power is shutdown, the data "A" has already been recorded onto the recording medium 109. Therefore, the data "A" will be recorded again after the restart of the power supply. However, this does not cause inconsistency between the file management information and the data entity in the file system.

Second Embodiment

<Outline>

Regarding a recording device that records data on a sequentially recordable write-once recording medium according to POW method, in the case of overwriting a plurality of pieces of data constituting a file recorded on the recording medium, the recording device pertaining to the first embodiment records pieces of substitution information corresponding to the overwritten pieces of data in the POW information management area on the recording medium 109 to virtually realize the overwriting.

In the second embodiment, the recording device does not record onto the recording medium the substitution information for each piece of data constituting a file. Instead, the recording device overwrites the file management information that shows the recording position on the recording medium of each piece of data constituting a file, and records substitution information corresponding to the overwritten file management information onto the recording medium, to realize the overwriting.

In the method adopted in the first embodiment, the number of pieces of substitution information to be recorded is the number of the pieces of data to be overwritten. On the other hand, it is only required to record a single piece of substitution information that shows the correspondence between the address on the recording medium where the file management information before the change is recorded and the address on the recording medium where the file management information after the change is recorded. Thus, it is possible to reduce the number of recordings of the substitution information.

<Structure>

Figure 12:
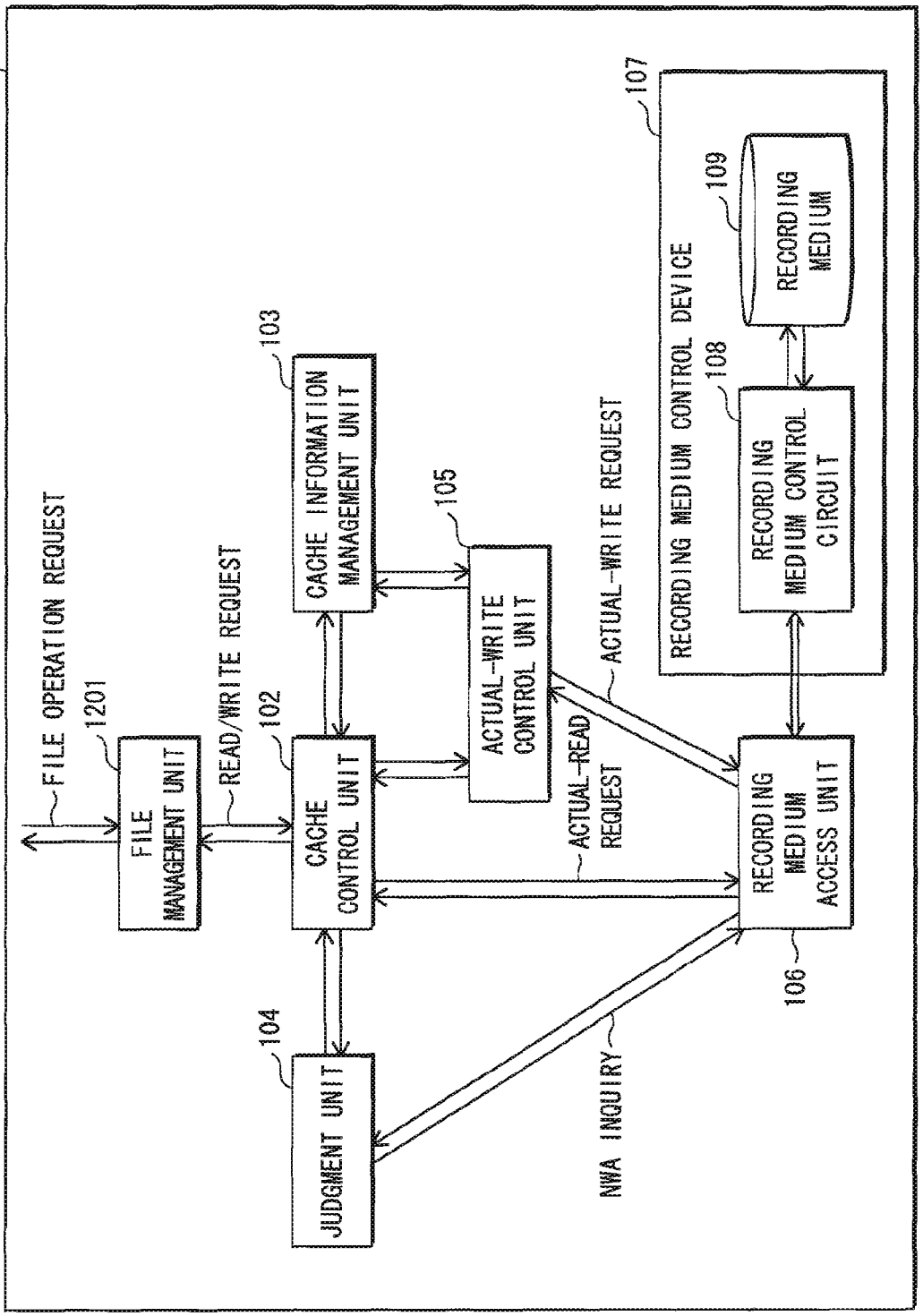
FIG. 12 is a flowchart showing the structure of a recording device 1200 of a second embodiment.

FIG. 12 shows the structure of a recording device 1200 pertaining to the second embodiment.

As FIG. 12 shows, the recording device 1200 includes a cache control unit 102, a cache information management unit 103, a judgment unit 104, an actual-write control unit 105, a recording medium access unit 106, a recording medium control device 107, and a file management unit 1201.

In addition to the functions of the file management unit 101, the file management unit 1201 has a function to, upon receipt of a request for updating data constituting a file, assign to the data to be updated an address showing the area beginning with the NWA on the recording medium 109 included in the recording medium control device 107.

<Operations>

The following explains the operations of the recording device 1200 having the structure described above, with reference to FIG. 13.

Figure 13A:
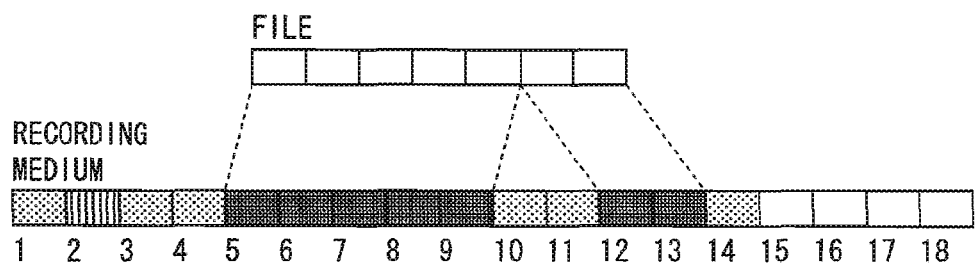
FIGS. 13A to 13C explain actual-write processing of the second embodiment.

FIG. 13A shows a file recorded on the recording medium 109 according to the POW recording method, and the recording position on the recording medium 109 of each piece of data constituting the file.

The size of the file corresponds to seven addresses on the recording medium 109. The pieces of data constituting the file are recorded at the addresses 5 to 9, 12 and 13 respectively, and the NWA is the address 15.

The file management information showing that the pieces of data constituting the file are recorded at the addresses 5 to 9, 12 and 13 respectively is recorded as the FE of the file, at the address 2 on the recording medium 109.

The following explains the case of overwriting the pieces of data constituting the file, recorded at the addresses 7 to 9 on the recording medium 109, based on comparison between the operations of the recording device 100 pertaining to the first embodiment and the recording device 1200 pertaining to the second embodiment.

Figure 13B:
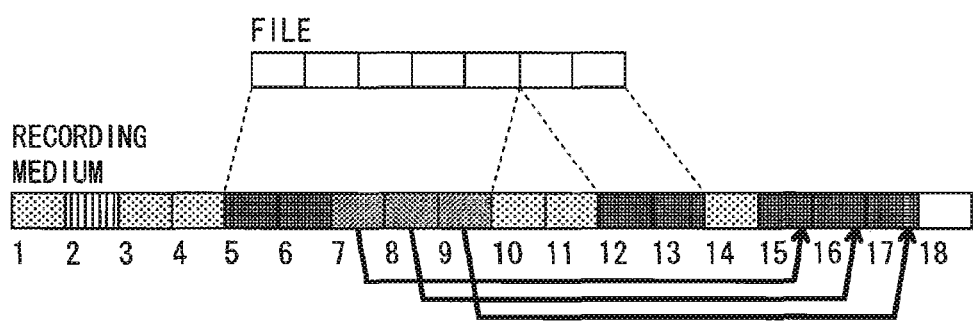

FIG. 13B shows the case the recording device 100 pertaining to the first embodiment performs overwriting of the file.

The recording medium access unit 106, which has received the actual-write request from the actual-write control unit 105, issues a command that corresponds to the actual-write request, to the recording medium control device 107. The recording medium control circuit 108, included in the recording medium control device 107, records the pieces of data requested to be overwritten at the addresses beginning with the NWA on the recording medium 109, namely at the addresses 15, 16 and 17. The recording medium control circuit 108 records three pieces of substitution information showing "address 7→address 15", "address 8→address 16" and "address 9→address 17" in the POW information management area on the recording medium 109.

Figure 13C:
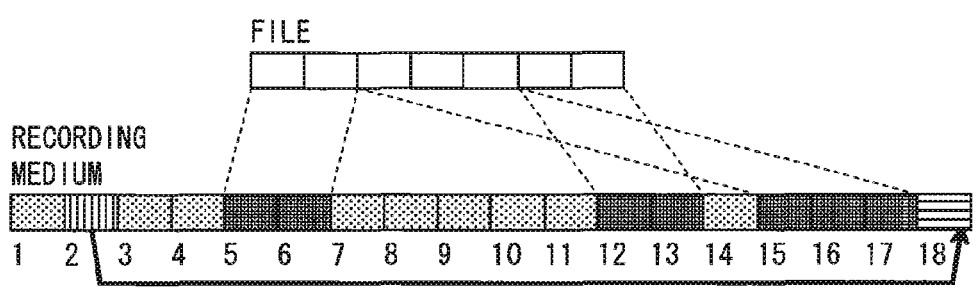

FIG. 13C shows the case the recording device 1200 pertaining to the second embodiment performs overwriting of the file.

Upon receipt of an update request for updating pieces of data constituting the file recorded at the addresses 7 to 9 on the recording medium 109, the file management unit 1201 assigns the addresses 15, 16 and 17 to the pieces of data to be updated, because the NWA is the address 15. Then the file management unit 1201 makes a write request to the cache control unit 102.

In the same manner as in the case of the first embodiment, the cache information management unit 103 accumulates the pieces of data to be updated. These pieces of data will be recorded on the recording medium 109 when required to be recorded on the recording medium 109.

Here, since the file management unit 1201 has assigned the recording areas beginning with the NWA to the pieces of data to be updated, the write request is not for overwriting and no substitution information is written into the POW information management area.

Also, in accordance with the updating of the data to be used for the updating of the file, the file management unit 1201 updates the FE of the file recorded at the address 2 on the recording medium 109.

The updating of the FE of the file actually is overwriting to the address 2. Thus, the recording medium control circuit 108 records the FE of the file at the NWA on the recording medium 109, and records a piece of substitution information "address 2→address 18" in the POW information management area.

In this way, in FIG. 13B, it is necessary to records three pieces of substitution information in the POW information management area, whereas, in FIG. 13C, it is only necessary to record a single piece of substitution information in the POW information management area to realize virtual overwriting. Thus, the FIG. 13C shows that the recording device 1200 pertaining to the second embodiment can reduce the number of recordings of the substitution information into the POW information management area.

<Supplementary Explanations>

The recording device pertaining to the present invention is described above based on the preferred embodiments. However, as a matter of course, the present invention is not limited to the embodiments described above, and the following modifications are acceptable.

(1) Typically, each of functional blocks of the recording device 100 pertaining to the first embodiment, the recording device pertaining to the modification example, and the recording device 1200 pertaining to the second embodiment is realized as an integrated circuit known as an LSI. However, they may be separately realized as individual chips, or part or all of them may be included in one chip. Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

Moreover, if, due to progress in the field of semiconductor technology or the derivation of another technology, a technology to replace LSI emerges, that technology may, as a matter of course, be used to integrate the functional block. The use of biotechnology or the like is considered to be a possibility.

(2) The consideration of the first embodiment explains, as an example, the recording device that records data on a sequentially recordable write-once recording medium according to POW method. However, also in the case of overwritable recording media, it is possible to reduce the possibility of inconsistency in the file system at power shutdown.

In such a case, the judgment unit 104 may judges a write request as an overwrite request if the request is to write data into the area as to which the file management information shows the existence of actual data, instead of performing the processing procedures shown in FIG. 5.

Specifically, if the FAT (File Allocation Table) is adopted in an overwritable recording medium, sectors on the disk are managed in units of cluster.

The FAT method prepares file allocation tables, the number of which is the same as the number of the clusters. File management information, showing the cluster that stores the rest of data stored in a certain cluster, is recorded in each of the file allocation table.

If the target area of the overwriting is the area where the file allocation table indicates that actual data is recorded, the judgment unit 104 can judge that the request is an overwrite request.

(3) The first embodiment assumes the case of unmounting the file system and that all the pieces of cache data stored in the cache information management unit 103 are to be recorded on the recording medium 109. However, in the case it is necessary to make a predetermined number of free spaces on the cache disk, only pieces of data that amounts to the predetermined number of free spaces may be recorded on the recording medium 109.

In this regard, it is the same as the first embodiment that pieces of cache data not indicating overwriting are recorded on the recording medium 109 before pieces of cache data indicating overwriting are recorded.

INDUSTRIAL APPLICABILITY

The recording device pertaining to the present invention can be used as a recording device that records data onto a recording medium according to the PWO (Pseudo Over Write) Recording method.

The invention claimed is:

1. A recording device that records pieces of data stored in a memory area into recording areas on a recording medium, the recording device comprising:
a non-volatile memory that is different from the memory area and the recording medium;
a judgment unit operable to judge, when each of the pieces of data is required to be recorded into a corresponding designated recording area on the recording medium, whether each of the designated recording areas on the recording medium contains any piece of data; and
a recording control unit operable to record pieces of data into the designated recording areas judged not to contain any piece of data by the judgment unit before recording any pieces of data that correspond to designated recording areas judged to contain any piece of data by the judgment unit,
wherein the recording control unit stores the pieces of data that correspond to the designated recording areas judged to contain any piece of data by the judgment unit into the non-volatile memory and records the same pieces of data stored in the non-volatile memory into the recording medium,
wherein the recording medium is a sequentially recordable write-once medium,
wherein designation of a recording area is made with use of an address of the recording area
wherein the recording device further comprises an address management unit operable to manage an address of a starting position of empty recording areas on the recording medium,
wherein the judgment unit judges that a designated recording area does not contain any piece of data if an address of the designated recording area is equal to or greater than the address of the starting position, and
wherein, if the judgment unit judges that the designated recording area does not contain any piece of data, the recording control unit records a corresponding one of the pieces of data into the designated recording area, and if the judgment unit judges that the designated recording area contains any piece of data, the recording control unit (i) stores the corresponding one of the pieces of the data into the non-volatile memory and (ii) records the corresponding one of the pieces of the data from the non-volatile memory into one of the empty recording areas that follows the designated recording area.

2. The recording device of claim 1,
wherein designation of a recording area is made with use of an address of the recording area,
wherein, in order to manage a file that includes pieces of data recorded on the recording medium, the recording device further comprises a file management unit operable to instruct the recording control unit to record, onto the recording medium, an identifier of the file and addresses on the recording medium of the pieces of data that are included in the file in association with each other, and wherein the judgment unit judges that a designated recording area does not contain any piece of data if an address of the designated recording area is not included in the addresses that have been recorded on the recording medium and are under management of the file management unit.

3. The recording device of claim 1, wherein designation of a recording area is made with use of an address of the recording area, wherein, in order to manage a file that includes pieces of data recorded on the recording medium, the recording device further comprises a file management unit operable to instruct the recording control unit to record, onto the recording medium, file management information that associates an identifier of the file with addresses on the recording medium of the pieces of data that are included in the file, and wherein when a piece of data included in the file under management of the file management unit is required to be updated, the file management unit instructs the recording control unit to record the piece of data to be updated into a recording area having an address that is different from the addresses associated with the file under the management of the file management unit, and to record, as the file management information of the file, the identifier of the file and the address of the piece of data to be updated in association with each other.

4. The recording device of claim 1, wherein after recording the pieces of data stored in the memory area onto the recording medium, the recording control unit deletes the pieces of data from the non-volatile memory.

5. The recording device of claim 1, wherein the recording medium is an overwritable recording medium, wherein, in order to manage a file including pieces of data recorded on the recording medium, the recording device further comprises a file management unit operable to instruct the recording control unit to record, onto the recording medium, file management information that contains, in association with each other, an identifier of the file and addresses of areas on the recording medium in which the pieces of data that are included in the file are recorded, wherein the designation of a recording area is made with use of an address associated with the recording area by the file management unit, and wherein the judgment unit judges, by using the file management information recorded on the recording medium, that a designated recording area does not contain any piece of data when an address of the designated recording area is not included in the addresses of the recording areas managed under the file management information.

* * * * *